United States Patent
Denman et al.

(10) Patent No.: US 9,723,458 B2
(45) Date of Patent: *Aug. 1, 2017

(54) PUSH-TO-TALK TELECOMMUNICATIONS SYSTEM UTILIZING AN VOICE-OVER-IP NETWORK

(71) Applicant: Apple Inc., Cupertino, CA (US)

(72) Inventors: Robert E. Denman, Plano, TX (US);
Sriram Parameswar, Allen, TX (US);
Barbara Derryberry, Plano, TX (US)

(73) Assignee: Apple Inc., Cupertino, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/689,227

(22) Filed: Apr. 17, 2015

(65) Prior Publication Data
US 2015/0223031 A1 Aug. 6, 2015

Related U.S. Application Data

(63) Continuation of application No. 14/246,595, filed on Apr. 7, 2014, now Pat. No. 9,014,742, which is a (Continued)

(51) Int. Cl.
*H04B 7/00* (2006.01)
*H04W 4/10* (2009.01)
(Continued)

(52) U.S. Cl.
CPC ............... *H04W 4/10* (2013.01); *H04L 61/60* (2013.01); *H04L 65/1006* (2013.01);
(Continued)

(58) Field of Classification Search
CPC . H04L 61/60; H04L 65/1006; H04L 65/1069; H04L 65/4038; H04L 65/4061;
(Continued)

(56) References Cited

U.S. PATENT DOCUMENTS

| 5,852,606 A | 12/1998 | Prince et al. |
| 6,154,463 A | 11/2000 | Aggarwal et al. |

(Continued)

OTHER PUBLICATIONS

Handley et al., "RFC 2543-SIP: Session Initiation Protocol," IESG Network Working Group, Mar. 1999, pp. 1-106.
(Continued)

*Primary Examiner* — Tan H Trinh
(74) *Attorney, Agent, or Firm* — Meyertons, Hood, Kivlin, Kowert & Goetzel, P.C.

(57) ABSTRACT

A method and system to provide ad-hoc push-to-talk calls between a plurality of users in a wireless packet data telecommunications network are described. The system may include: a wireless communication network including push-to-talk (PTT) functionality, with a Session Initiation Protocol (SIP) Proxy Server; a SIP Registrar and Location Server operable to store contact addresses of active mobile devices; a Realtime Transport Protocol (RTP) Media Gateway (PTT Server) operable to function as a call endpoint for each of a plurality of mobile devices wherein the plurality of mobile devices may be segmented into membership groups, the PTT Server further operable to multicast a communication from one member of the group to the other members of the group; and an Internet Protocol (IP) network interconnecting the SIP Proxy server, the SIP Registrar and Location Server, and the PTT Server.

20 Claims, 9 Drawing Sheets

Related U.S. Application Data continuation of application No. 13/898,473, filed on May 21, 2013, now Pat. No. 8,694,041, which is a continuation of application No. 12/796,811, filed on Jun. 9, 2010, now Pat. No. 8,447,341, which is a continuation of application No. 10/028,086, filed on Dec. 21, 2001, now Pat. No. 7,801,953.

(51) Int. Cl.
| | | |
|---|---|---|
| *H04W 76/00* | (2009.01) | |
| *H04L 29/06* | (2006.01) | |
| *H04W 4/08* | (2009.01) | |
| *H04L 29/12* | (2006.01) | |
| *H04W 72/00* | (2009.01) | |
| *H04W 80/10* | (2009.01) | |

(52) U.S. Cl.
CPC ...... *H04L 65/1069* (2013.01); *H04L 65/4038* (2013.01); *H04L 65/4061* (2013.01); *H04W 4/08* (2013.01); *H04W 76/005* (2013.01); *H04W 72/005* (2013.01); *H04W 80/10* (2013.01)

(58) Field of Classification Search
CPC ...... H04W 4/08; H04W 4/10; H04W 72/005; H04W 76/005; H04W 80/10
USPC .... 455/518, 519, 456.2, 520, 426, 447, 450, 455/422, 445, 560, 554.1, 90.2, 41.2, 455/426.1, 553.1, 415, 566, 435.1, 510, 455/412.1, 552, 550, 567, 458, 414.1; 709/204, 227; 370/263, 260, 338, 328
See application file for complete search history.

(56) References Cited

U.S. PATENT DOCUMENTS

| | | | |
|---|---|---|---|
| 6,295,284 B1 | 9/2001 | Maggenti | |
| 6,321,095 B1 | 11/2001 | Gavette | |
| 6,449,491 B1 | 9/2002 | Dailey | |
| 6,477,150 B1 | 11/2002 | Maggenti et al. | |
| 6,484,037 B1 | 11/2002 | Schmidt et al. | |
| 6,625,141 B1* | 9/2003 | Glitho | H04L 12/6418 370/352 |
| 6,901,270 B1 | 5/2005 | Beach | |
| 6,930,994 B1 | 8/2005 | Stubbs | |
| 7,016,351 B1 | 3/2006 | Farinacci et al. | |
| 7,801,953 B1 | 9/2010 | Denman et al. | |
| 7,826,603 B1 | 11/2010 | Denman et al. | |
| 8,027,316 B1 | 9/2011 | Barrow et al. | |
| 8,077,634 B2* | 12/2011 | Maggenti | H04M 3/56 370/260 |
| 8,380,840 B2* | 2/2013 | Vijay | H04L 29/06027 709/224 |
| 8,428,237 B1 | 4/2013 | Denman et al. | |
| 8,447,341 B2 | 5/2013 | Denman et al. | |
| 8,694,041 B2* | 4/2014 | Denman | H04W 4/10 370/261 |
| 9,014,742 B2* | 4/2015 | Denman | H04W 4/10 370/335 |
| 2001/0038624 A1 | 11/2001 | Greenberg et al. | |
| 2002/0042826 A1 | 4/2002 | Gaus et al. | |
| 2002/0131575 A1* | 9/2002 | Gallant | H04L 12/14 379/220.01 |
| 2003/0005280 A1* | 1/2003 | Bobde | H04L 29/06027 713/150 |
| 2003/0014488 A1 | 1/2003 | Dalal et al. | |
| 2003/0067903 A1 | 4/2003 | Jorgensen | |
| 2003/0148785 A1* | 8/2003 | Mangal | H04W 68/00 455/552.1 |
| 2003/0190888 A1* | 10/2003 | Mangal | H04B 3/36 455/3.05 |
| 2004/0148395 A1* | 7/2004 | Schulzrinne | H04L 29/06 709/227 |
| 2004/0219940 A1* | 11/2004 | Kong | H04W 4/10 455/518 |
| 2006/0014556 A1* | 1/2006 | Park | H04W 4/10 455/518 |
| 2006/0034195 A1 | 2/2006 | Blaiotta et al. | |
| 2006/0046757 A1* | 3/2006 | Hoover | H04M 3/533 455/518 |
| 2006/0046758 A1* | 3/2006 | Emami-Nouri | H04W 4/10 455/518 |
| 2006/0116151 A1* | 6/2006 | Sullivan | H04W 4/10 455/519 |
| 2006/0120308 A1* | 6/2006 | Forbes | H04M 3/42042 370/260 |
| 2006/0153102 A1* | 7/2006 | Kuure | H04Q 3/0016 370/263 |
| 2006/0159238 A1* | 7/2006 | Akita | H04W 4/10 379/67.1 |
| 2006/0205427 A1* | 9/2006 | Laible | H04M 3/385 455/518 |
| 2006/0223459 A1 | 10/2006 | Maggenti | |
| 2006/0270362 A1* | 11/2006 | Emrich | H04M 3/53308 455/90.2 |
| 2007/0002779 A1* | 1/2007 | Lee | H04W 4/10 370/260 |
| 2007/0129051 A1 | 6/2007 | Sung et al. | |
| 2007/0237321 A1 | 10/2007 | Bloebaum et al. | |
| 2007/0298768 A1* | 12/2007 | Lee | H04W 4/10 455/412.1 |
| 2008/0005232 A1* | 1/2008 | Feng | H04W 4/10 709/204 |
| 2008/0161062 A1* | 7/2008 | Harris | H04W 76/002 455/567 |
| 2008/0229390 A1 | 9/2008 | Holm et al. | |
| 2008/0248826 A1* | 10/2008 | Holm | H04W 84/08 455/518 |
| 2008/0305820 A1* | 12/2008 | Sadiq | H04W 4/10 455/518 |
| 2009/0274090 A1* | 11/2009 | Akhtar | H04L 65/4061 370/328 |
| 2011/0231558 A1* | 9/2011 | Holm | H04L 65/4061 709/227 |
| 2012/0052818 A1* | 3/2012 | Jun | H04W 52/0206 455/68 |
| 2012/0257527 A1 | 10/2012 | Jorgensen | |

OTHER PUBLICATIONS

Roach, "Event Notification in SIP," Memo from Internet Engineering Task Force, Ericsson Inc., Mar. 2000, pp. 1-8.

Donavan, S., "RFC 2976—The SIP INFO Method," Network Working Group, dynamicsoft, Oct. 2000, pp. 1-7.

Newton, H., "Newton's Telecom Dictionary," 15th Expanded Edition, Feb. 1999, Miller Freeman, Inc., ISBN: 1-57820-031-8, cover page and p. 289.

U.S. Appl. No. 13/898,473, filed May 21, 2013, Robert E. Denman.

\* cited by examiner

PUSH-TO-TALK TELECOMMUNICATIONS SYSTEM UTILIZING AN VOICE-OVER-IP NETWORK

CROSS-REFERENCE TO RELATED APPLICATIONS

The present application is a continuation of U.S. patent application Ser. No. 14/246,595, filed on Apr. 7, 2014, entitled PUSH-TO-TALK TELECOMMUNICATIONS SYSTEM UTILIZING AN VOICE-OVER-IP NETWORK, having projected U.S. Pat. No. 9,014,742, which is a continuation of U.S. patent application Ser. No. 13/898,473, filed on May 21, 2013, of the same title, now issued as U.S. Pat. No. 8,694,041, which is a continuation of U.S. patent application Ser. No. 12/796,811, filed on Jun. 9, 2010, of the same title, now issued as U.S. Pat. No. 8,447,341, which is a continuation of U.S. patent application Ser. No. 10/028,086, filed on Dec. 21, 2001, of the same title, now issued as U.S. Pat. No. 7,801,953. All of these applications are hereby incorporated by reference in their entirety.

BACKGROUND OF THE INVENTION

The invention relates generally to a telecommunications network and, more particularly, to a method and apparatus for half-duplex communication among multiple telecommunications devices via a packet data network.

Currently, telecommunications networks exist that enable a telecommunications device to directly access another through a digital two-way radio feature. At least one telecommunications provider, Nextel, has been very successful providing such a network. With Nextel's system, a user can have instant access by pressing a button to reach other users on the network.

However, a network does not yet exist that can provide such communication to other users via a wireless packet data network. Therefore, what is needed is an invention that can provide push-to-talk to another user via a wireless packet data network.

SUMMARY OF THE INVENTION

The present invention includes a system and method for Push-to-talk (PTT) service to another user via a wireless packet data network. To this end, in one embodiment the system includes a packet data network with at least one mobile station, a radio access network, a database server, a registrar and location server, an Interactive Multimedia Server (IMS), and a PTT server that provides the PTT service to other PTT users on the packet network.

The IMS includes a Session Initiation Protocol (SIP) Proxy Server which may also function as a back-to-back user agent (BBUA). The SIP Registrar and Location Server is operable to store contact addresses of active mobile devices. The PTT Server is operable to function as a SIP call endpoint for each of a plurality of mobile devices wherein the plurality of mobile devices are segmented into membership groups, the PTT Server further operable to multicast a communication from one member of the group to the other members of the group. An Internet Protocol (IP) network interconnects the SIP Proxy server, the SIP Registrar and Location Server, and the PTT Server.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
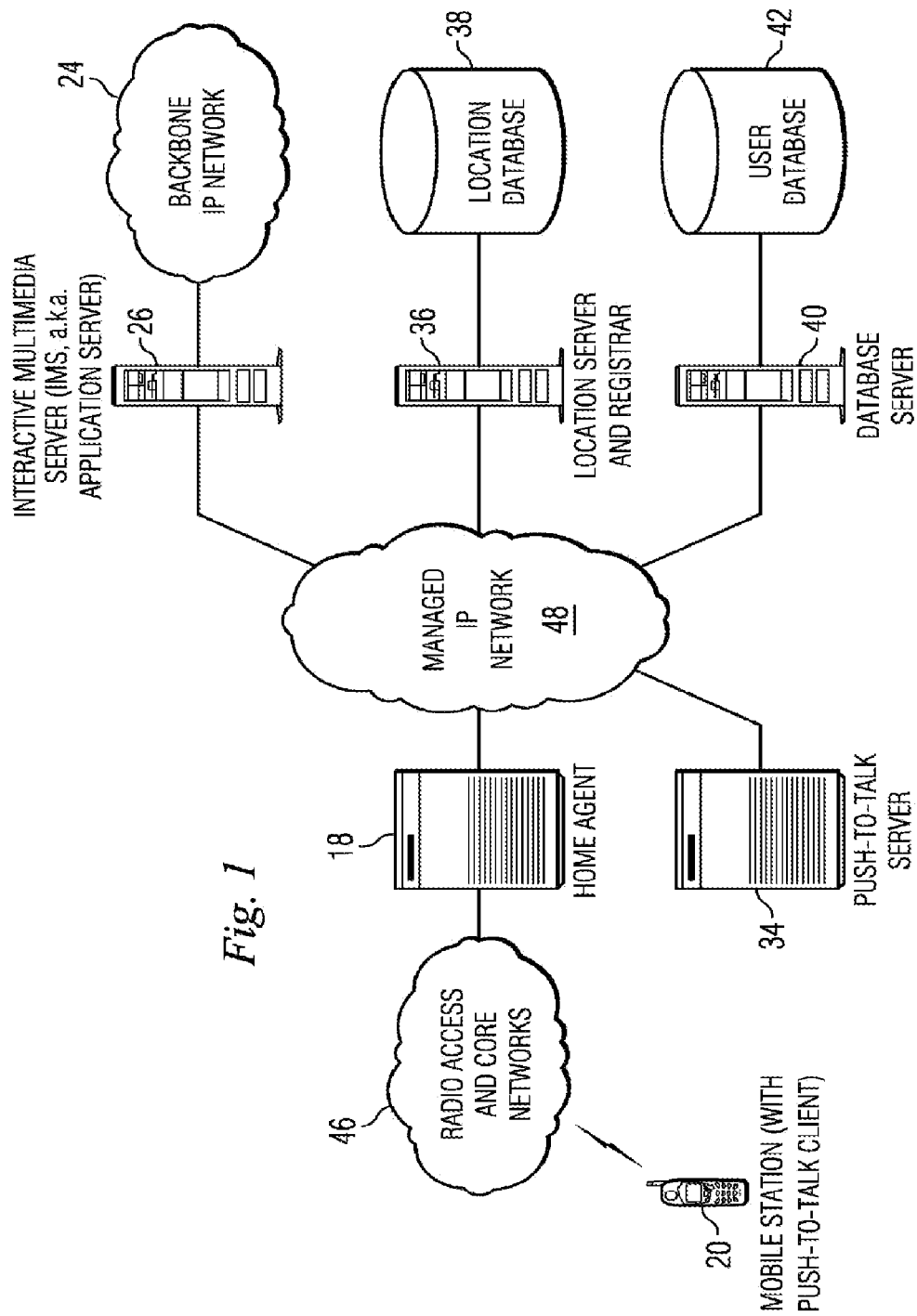
FIG. 1 illustrates an architecture of the preferred embodiment.

The present invention can be described with several examples given below. It is understood, however, that the examples below are not necessarily limitations to the present invention, but are used to describe typical embodiments of operation.

A list of definitions is first described in order to better understand the invention.

Group members—the set of users who may join a group session.

Session—a relationship among participating group members wherein calls are enabled between the same.

Join—the action taken by a group member (or automatic action taken by the member's Push-to-talk client) to participate in a group session.

Call—a set of consecutive speech transmissions between group members participating in a session.

Speech transmission—an instance of half-duplex (HDX) voice communication from one session participant to one or more other session participants.

Speech token—an abstraction that is introduced to explain talker arbitration (i.e., to describe how one obtains the right to speak within a call). There is exactly one speech token per group. To speak, one must be granted the speech token.

Peer-to-peer communication model—call participants may not interrupt one another, and no participant has special privileges with respect to other participants.

Superior-subordinate communication model—subordinates communicate as in the peer-to-peer model, but a superior has special privileges with respect to subordinates (e.g., queued requests for speech token, ruthless pre-emption of the speech token, forcing called parties to join the group session). A superior may opt to relate in the peer-to-peer model, and not invoke his/her special privileges.

Public audio—audio which plays only when the recipient has opted into group calls by virtue of having joined the group.

Invited audio—Audio which plays only when the recipient ("invitee") has accepted an invitation to talk.

Forced audio—audio which plays to the recipient regardless if the recipient opted to hear it.

The following table identifies the types of groups that have been considered from the perspective of the network. Groups known only to the client have not been considered:

|  | Type of Group | | |
|---|---|---|---|
| Group Descriptors | Open Group | Closed Group | Ad Hoc Group |
| Example | PTT in a public, open chat room | Peer-to-peer: PTT service within a closed chat session, or in a company context. Superior-subordinate: dispatch service. | FIGS. 10-12 add some additional detail. Note that a 1-to-1 Direct Connect Call is a degenerate case of an ad-hoc group call. |
| Membership persistence | Session participation defines membership | Membership transcends participation in any group session | Lasts for exactly one call |
| Related session persistence | Lasts as long as one user has joined the group's session | Lasts as long as one member has joined the group's session | Lasts for exactly one call |
| Relationship between session & call | Session may span multiple calls | Session may span multiple calls | Session lasts for one call only |
| Membership selection | Any user may opt to join the group's session, & thereby become a member | A group administrator specifies group membership (e.g., via provisioning such in the directory server); only these may join a group session | Call/alert originator defines membership as part of the call/alert; only these may join the session & participate in the call. |
| Group URL Addressable with other URLs in an ad hoc group call/alert | No, to prevent "voice spamming" | Configurable. If allowed & if call is placed by non-member, the call is not allowed to join any in-progress closed group session. | Not applicable. |
| User communication model | Peer-to-peer | Provisioned as either peer-to-peer, or superior-subordinate. | Peer-to-peer, except when all members belong to the same closed group & one participant is a superior, in which case the superior-subordinate model may be used. |

Given this analysis of types of groups, we now present in the table below how network functionality invoked in a given use case may vary according to the type of group that is involved, & how certain use cases are specific to one or more group types. Highlighted use cases have a corresponding figure.

| | | Network Functionality Invoked | | | | | |
|---|---|---|---|---|---|---|---|
| Use Case (from viewpoint of end user) | Applicable Group Type | Define Group Members | Join User(s) to Group Session | Contact Members Not Already in Session | Talker Arbitration (i.e., vie for speech token) | Remove User(s) from Group Session | Dissolve Group Membership |
| Join Group | Open | Joining adds user as member | Yes, thereby enabling public radio | No | No | No | No |
| | Closed | No | Yes, thereby enabling public radio | No | No | No | No |
| Alert Group | Closed | No | Alerting party only, if not already in session | Registered members only (e.g. those with current registration in SIP registrar). | No | No | No |
| | Ad hoc | Alerter & all invitees | Alerting Party only | Registered members only | No | No | No |

| Use Case (from viewpoint of end user) | Applicable Group Type | Network Functionality Invoked |||||| 
|---|---|---|---|---|---|---|---|
| | | Define Group Members | Join User(s) to Group Session | Contact Members Not Already in Session | Talker Arbitration (i.e., vie for speech token) | Remove User(s) from Group Session | Dissolve Group Membership |
| Alert-Initiated Group Call (i.e., in response to an alert) | Closed, peer-to-peer model | No | Calling party only, if not already in session, since called parties employ invited audio | Registered members only (to clear alert) | Calling party vies for token per normal arbitration | No | No |
| | Closed, superior in superior-subordinate model | No | Calling party, if not already in session. If authorized & opted, all registered group members not already in session depending on option selected by the caller, we have either "forced audio" or, depending on whether or not alerted members were already in the group at the time the alert was broadcast, "public audio" or "invited audio." | Registered members only, either to clear alert or to speak to members that have been placed into forced audio | Calling party vies for token per selected, authorized option | No | No |
| | Ad hoc, assuming that the ad hoc group members do not belong to the same closed group or that, if they do belong to the same closed group, the private call uses the peer-to-peer model. If the caller is a superior and the ad hoc group call targets are subordinates, then the network | No | Calling Party only | Registered members only (to clear alert) | Calling party vies for token per normal arbitration | No | No |

-continued

| Use Case (from viewpoint of end user) | Applicable Group Type | Network Functionality Invoked ||||||
|---|---|---|---|---|---|---|---|
| | | Define Group Members | Join User(s) to Group Session | Contact Members Not Already in Session | Talker Arbitration (i.e., vie for speech token) | Remove User(s) from Group Session | Dissolve Group Membership |
| | functionality invoked would be as in the immediately preceding table entry. | | | | | | |
| Group Call | Open | No | No, as user must have previously joined group | N/A | Calling party views for token per normal arbitration | No | No |
| | Closed, peer-to-peer model | No | Calling party only, if not already in session - "public audio" or "invited audio", depending of whether the originator simply wants to speak to those who've already joined the session or the originator wishes to do this plus alert group members not already in session. The call flow corresponding to this table entry assumes that the originator has already joined the group session and merely wishes to speak to others who have also joined the group session. | If authorized & opted, all registered members not in session - a combination of a call to those already in the group session, and an alert to those who have not already joined the group session. | Calling party vies for token per normal arbitration | No | No |
| | Closed (superior in superior-subordinate model) | No | Calling party, if not already in session. If authorized & opted, all registered group | If authorized & opted, all registered members not in session - "Forced audio" and alerting | Calling party vies for token per selected, authorized option | No | No |

-continued

| Use Case (from viewpoint of end user) | Applicable Group Type | Network Functionality Invoked | | | | | |
|---|---|---|---|---|---|---|---|
| | | Define Group Members | Join User(s) to Group Session | Contact Members Not Already in Session | Talker Arbitration (i.e., vie for speech token) | Remove User(s) from Group Session | Dissolve Group Member-ship |
| | | | members not already in session, and if the caller so chooses, "forced audio". | group members not already in session are mutually exclusive. If forced audio is not selected by the caller, then members already in the group session would have public audio and any alerted members would have invited audio. | | | |
| | Private, ad hoc group call from superior to subset of closed group members | Alerter & all invitees | Calling party, if not already in session. If authorized & opted, all registered group members not already in session, and if the caller so chooses, "forced audio" | If authorized & opted, all registered members not in session. "Forced audio" and alerting group members not already in session are mutually exclusive. If forced audio is not selected by the caller, then members already in the group session would have public audio and any alerted members would have invited audio. | Calling party vies for token per selected, authorized option | No | No |
| Talker Arbitration | Open | No | No | No | Normal arbitration | No | No |
| | Closed, peer-to-peer model | No | No | No | Normal arbitration | No | No |
| | Closed, superior in superior-subordinate model | No | No | No | Superior vies for token per selected, authorized option | No | No |
| | Ad hoc | No | No | No | Depending on model used, either | No | No |

-continued

| Use Case (from viewpoint of end user) | Applicable Group Type | Network Functionality Invoked | | | | | |
|---|---|---|---|---|---|---|---|
| | | Define Group Members | Join User(s) to Group Session | Contact Members Not Already in Session | Talker Arbitration (i.e., vie for speech token) | Remove User(s) from Group Session | Dissolve Group Membership |
| | | | | | normal arbitration or vying for token per selected, authorized option | | |
| Call Participants Stop Talking | Open | No | No | No | No | No | No |
| | Closed | No | No | No | No | No | No |
| | Ad hoc | No | No | No | No | All removed from session | Yes |
| Leave Group As with joining a group, this could result from an explicit user action, or be automatically done by the user's PTT client (e.g., at power-down). | Open | No | No | No | No | User removed from session | User removed from group member-ship |
| | Closed | No | No | No | No | User removed from session | No |
| | Ad hoc - this would only happen in the peer-to-peer model when a user decides to leave an ad hoc group call before it is finished. Note that, after the call has completed, the network will automatically remove all members from the group session and dissolve ad hoc group membership. | No | No | No | No | User removed from session | User removed from group member-ship |

Alerts

An alert can be delivered only if the target has a current registration with the SIP registrar and is accessible via a 1×RTT data call. The target can either respond to the alert by one of the following means: Pushing the PTT button, which will cause a standard Push-to-talk call to be established; clear the alert, which discards the alert without a response to the originator; and store the alert which saves the alerting party's addressing information for later retrieval, and will stop audible alert tones in progress.

Now turning to FIG. 1, an embodiment of the main architecture is shown. The Home Agent (RA) 18, part of the 1×RTT core network, provides IMS network components 48 with a single interface for communication with the mobile station's Push-to-talk client 20. While a 1×RTT network is here depicted, the invention is applicable also to UMTS radio access and core networks.

The application server 26 provides SIP access/services (e.g. proxy, redirect, back-to-back user agent, authentication, etc.). Additionally, the application server 26 can run in any of the following service modes: stateless and stateful.

The PTT Server 34 for Push-to-talk service, manages talker arbitration, tracks active member participation in a group, and distributes received Real time Transport Protocol (RTP) voice packets to call participants. The PTT server 34 functions as a SIP back-to-back user agent (BBUA).

A Registrar and Location Server 36 provides for terminal registration of availability and contact locations, and for proxy retrieval of location/contact information. The associated Location Database 38 stores and manages dynamic location updates for subscribers. The Application Server 26 utilizes the JDBC interface to access data when handling sessions, although other protocols could be used to access the data.

A Database Server 40 provides access to the user and group database 42. The database 42 stores all of the user profile information for the Application Server 26, and group membership information for the PTT Server 34. The Application 26 and PTT 34 Servers utilize JDBC to access stored information, although other protocols could be used for access.

Additionally, the Radio Access and Core networks is shown 46 along with the managed IP network 48 and the rest of the elements in FIG. 1.

Wireless Specific Codecs

For mobiles being served by a 1×RTT radio access network (RAN) 46, optimal voice quality is obtained via use of the Enhanced Variable Rate Codec (EVRC) or Selectable Mode Vocoder (SMV), with over-the-air speech frames carrying EVRC/SMV payload but no VoIP headers. Present 3GPP2 QoS framework plans, therefore, envision use of EVRC/SMV circuit voice over the air in the All-IP Network. Accordingly, Push-to-talk clients use the EVRC/SMV vocoder when served by a 1×RTT network 46, such that transcoding is not required between 1×RTT mobiles. Where clients do not employ the same codec, a media gateway will be needed to provide transcoding.

It should be noted that the above described components are logical or functional elements, where multiple functions could be provided by the same hardware platform.

Figure 2:
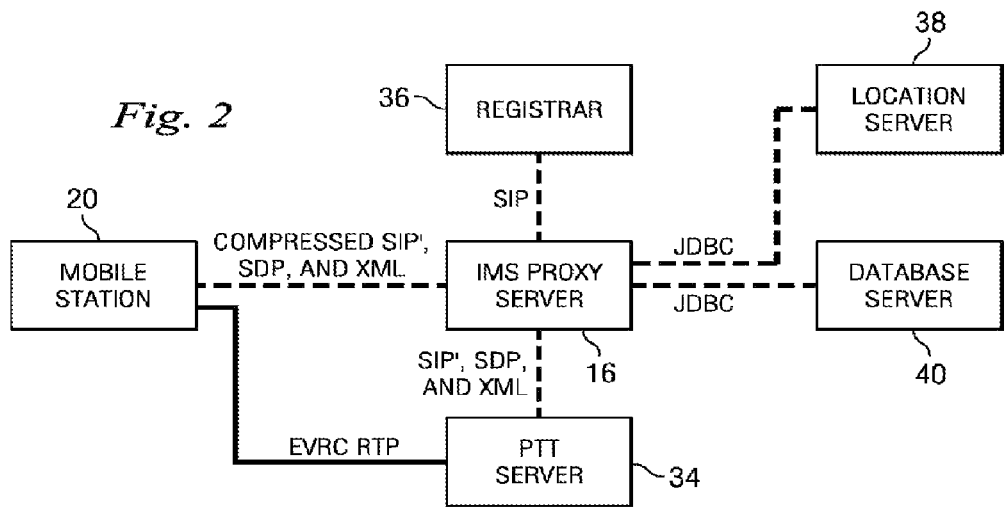
FIG. 2 illustrates an application-layer interfaces and protocols.

Now turning to FIG. 2, the diagram depicts the application-layer interfaces and protocols in the present embodiment. For each of the interfaces, the table below explains the degree to which the interface complies with a standard.

Individual target clients are addressed by means of a user-specific SIP Uniform Resources Locator (URL). However, groups of clients are addressed by one of two means: a group-specific URL may be used to join a pre-provisioned closed group or the user may specify a list of targeted, individual users' SIP URLs for an ad hoc group call or alert. However, another embodiment may support use of a group-specific URL for a call or alert to a closed group.

Quality of Server (QoS) Requirements

Bandwidth requirements for the IP backbone (BBN) network would depend on the traffic model. Other network requirements are derived from the QoS requirements for transport of SIP signaling & half-duplex (HDX) EVRC/SMV VoIP. QoS requirements for SIP signaling include the following: very high reliability (i.e., very low packet loss and very low packet corruption); and real-time latency.

For full-duplex (FDX) voice traffic, subjective voice quality studies indicate the following: packet loss rate (PLR) of more than 2% significantly affects perceived voice quality; beyond 150 ms end-to-end delay, increasing latency results in rapid deterioration of perceived voice quality; and jitter should be less than 1 ms.

Push-to-talk voice transport requirements can be inferred from these metrics for FDX voice traffic. For Push-to-talk's HDX voice, high reliability is likewise required. This is especially true, considering that under ideal RF conditions with forward error correction (FEC), non-RLP-protected frames incur a 2% frame error rate (FER) over the air (OTA)—one packet's EVRC/SMV voice sample would fit into a single frame—and Push-to-talk voice traffic will typically pass OTA twice.

| Interface | Protocol | Degree of Standards Compliance |
|---|---|---|
| Mobile Station 20 and PTT Server 34 | Enhance Variable Rate Coding (EVRC/SMV) | Completely standardized. For UMTS radio access networks, other codecs would be used. |
| | Real-time Transport Protocol (RTP) | EVRC/SMV variant of RTP is needed, but it is soon to be standardized. |
| Mobile Station 20 and IMS Proxy Server 16 | Compression | SIP compression techniques; inter-working is possible so long as the mobile and IMS employ the same algorithm. |
| | Session Initiated Protocol (SIP) - Prime | Extensions to IETF-specified SIP used in order to reduce over the air Push-to-talk signaling; inter-working is possible where the mobile and IMS employ the same extensions. |
| | Session Description Protocol (SDP) | Likely completely standardized, once EVRC/SMV is included as a codec. |
| | eXtended Markup Language (XML) | This is transparently passed by the IMS between the mobile 20 and the PTT server 34. While standardized, both the mobile 20 and PTT server 34 must employ the same Document Type Definition (DTD) for inter-working to occur. |
| IMS Proxy Server 16 and PTT Server 34 | SIP | Extension to IETF-specified SIP used in order to reduce over the air Push-to-talk signaling; inter-working is possible where the PTT server 34 and IMS 16 employ the same extensions. |
| | SDP | Likely completely standardized, once EVRC/SMV is included as a codec. |
| | XML | This is transparently passed by the IMS 16 between the mobile 20 and the PTT server 34. While standardized, both the mobile 20 and the PTT server 34 must employ the same Document type Definition (DTD) for inter-working to occur. |
| IMS Proxy Server 16 and Registrar 36 | SIP | Completely standardized |
| IMS Proxy Server 16 and Location Server 36 | Java Database Connectivity (JDBC) | Standardized, but both the IMS 16 and Location Server 36 must employ the same schema for inter-working to occur. Other protocols could also be used. |
| IMS Proxy Server 16 and Database Server 40 | JDBC | Standardized, but both the IMS 16 and Database Server 40 must employ the same schema for successful inter-working. Other protocols could also be used. |

Regarding end-to-end delay, the traditional latency requirement can be significantly relaxed, given both the HDX nature of speech transmissions and the time between speech transmissions required for talker arbitration. (Latency affects perceived voice quality by increasing the round-trip delay for someone to respond to a given talker.) In contrast to traditional telephony, signaling (e.g. SIP signaling) will likely have more stringent latency requirements than voice.

Jitter is typically removed by the endpoints by use of a jitter buffer, and in the case of the present embodiment, the PCF does this prior to sending voice packets over the air on a circuit voice link. An x-millisecond jitter buffer will remove jitter from traffic within an x-millisecond window, at the expense of adding x milliseconds of latency. Late packets arriving outside of the current window are thrown away, increasing the PLR. IP networks, especially unmanaged ones, can add 10 s of milliseconds of jitter; however, given the relaxed end-to-end delay requirement relative to FDX telephony, the present jitter buffer can likely afford to be larger, since the increased delay to remove jitter would likely have less impact on perceived voice quality than jitter-induced packet loss. The bottom line for the IP network requirements is that it must support highly reliable transport of Push-to-talk traffic with real-time latency requirements, minimizing jitter as much as possible. Hence, in the present embodiment, QoS enhancements have been made, as noted below in connection with FIG. 3.

Direct Access Architecture—Logical

Figure 3:
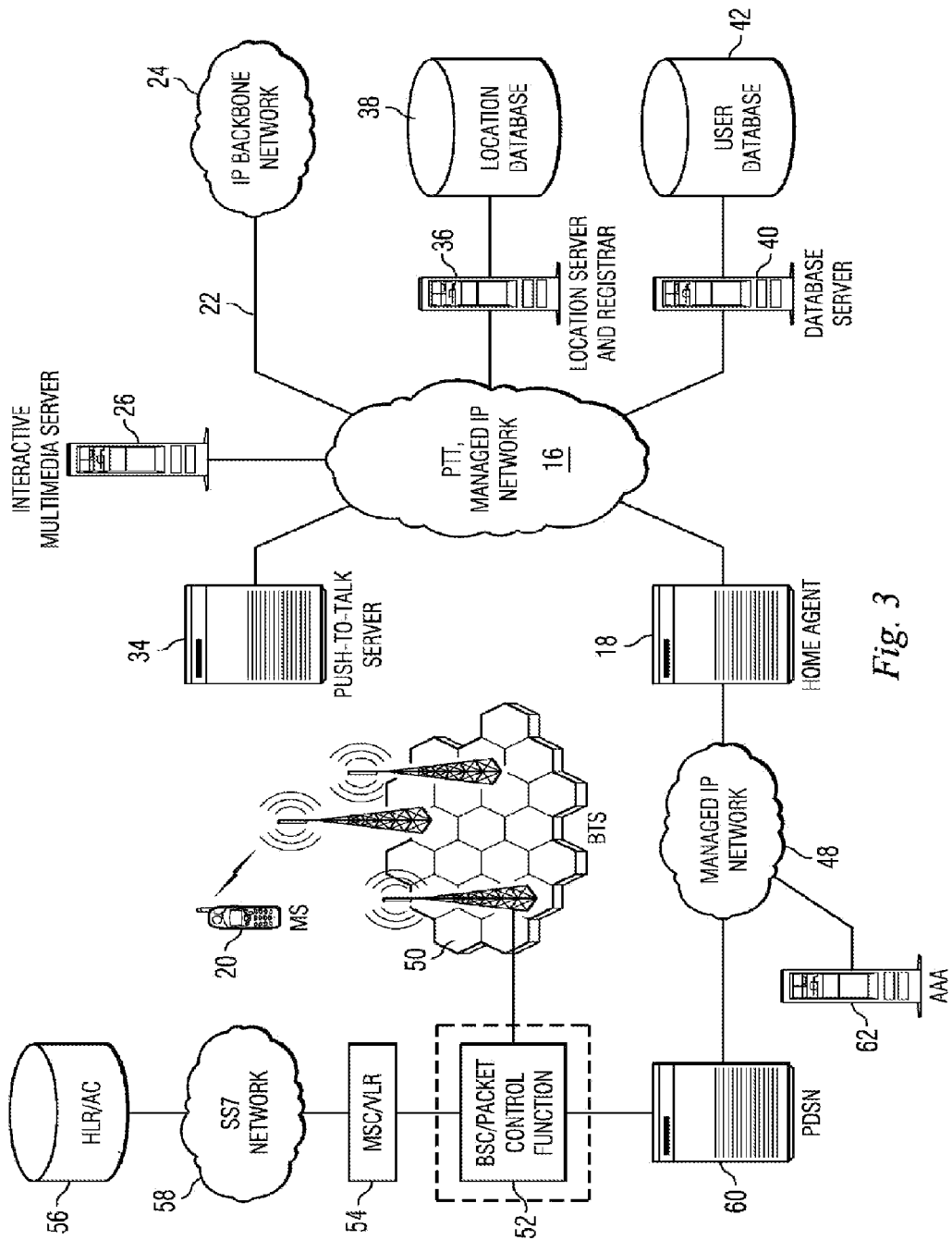
FIG. 3 illustrates another view of the architecture of the preferred embodiment.
Figure 5:
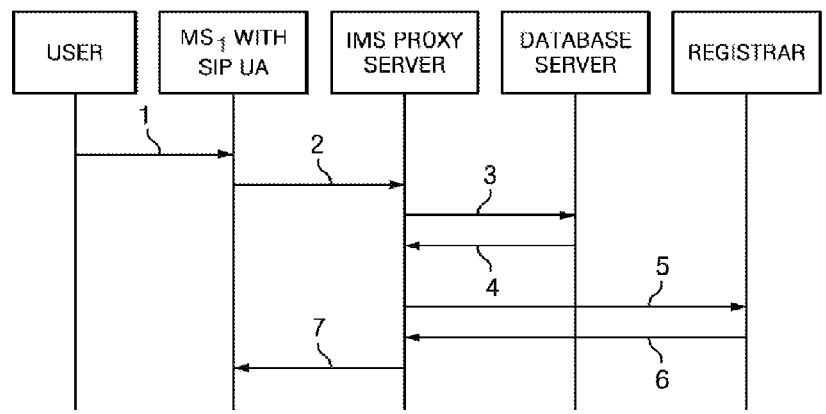
FIGS. 5-12 illustrate call flows of the preferred embodiment.

Now turning to FIG. 3, a more detailed view of the Push-to-talk network reference architecture is shown. In this view, the IP backbone network is treated as a trusted network; a router provides connectivity between the backbone network and the managed IP network. Additionally, the "PTT, Managed IP Network" 16 and "Managed IP Network" 48 could be one and the same. Moreover, in this embodiment, Internet and Operational Support System (OSS) connectivity is provided via the backbone network 24.

Further, although FIG. 3 is similar to FIG. 1, a base terminal station 50 is shown connecting the mobile station 20 to the base station controller/packet control subsystem 52. The BSC in turn connects directly to the mobile switching center/visitor location register 54 and then the home location register 56 through an SS7 network 58.

Moreover, the BSC also connects to a Packet Data Serving Node (PDSN) 60 and then to the managed IP network 48. The authentication, authorization and access server 62 is also connected to the managed IP network 48.

Specifically, in this embodiment, the MS 20 is a traditional 1×RTT mobile handset with the following enhancements: includes user interface enhancements to support Push-to-talk and directory service functionality; includes a SIP-based Push-to-talk client; and has the capability to multiplex data (including SIP signaling) and EVRC/SMV circuit voice packets onto a data call's base channel, by means of an RLP secondary service option.

The BTS (Base station Transceiver Subsystem) 50 includes a traditional BTS function. The Push-to-talk calls are largely transparent to the BTS 50, as it treats them much the same as a traditional 1×RTT data call.

In this embodiment, the BSC's Packet Control Function (PCF) 52 is the BSC data selection function for 1×RTT data. Besides traditional BSC and PCD functionality, the PCF additionally provides the following:

RLP secondary service option (SO) for multiplexing of EVRC/SMV circuit voice and data over the same base RF channel;

DiffServ marking for to distinguish uplink voice from data traffic;

Prioritized queuing for voice versus SIP signaling versus other data for downlink traffic, and for voice versus other data for uplink traffic;

Multiplexing of user's EVRC/SMV voice packets & PPP data packets over a single GRE tunnel on the R-P interface;

Jitter buffer for downlink voice packets;

Re-sequencing of out-of-order, downlink voice packets; and

Discarding of overly aged, downlink voice packets.

The MSC/VLR 54 provides traditional MSC/VLR functions. Push-to-talk calls are largely transparent to the MSC/VLR 54. It treats them much the same as any other 1×RTT data call (i.e., provides authorization & authentication).

The HLR/AC 56 provides traditional HLR/AC functions. Push-to-talk calls are largely transparent to the HLR/AC, as they are treated much the same as any other 1×RTT data call (provides authorization & authentication).

In this embodiment, the PDSN (Packet Data Serving Node) 60 provides traditional PDSN functionality:

IP network connectivity for 1×RTT data calls;

Establishment of PPP links with mobile stations for data traffic;

Mobile IP (MIP) foreign agent (FA) capability, including reverse tunneling;

Interaction with the AAA server for authentication & accounting purposes;

The PDSN additionally provides the following for Push-to-talk traffic;

PPP-free operation for exchange of voice packets with the PCU;

VoIP gateway, stripping RTP/UDP/IP headers for downlink EVRC/SMV traffic, and adding these headers for uplink EVRC/SMV traffic;

Over-the-air header compression for UDP/IP (e.g., for SIP traffic) and TCP/IP (per evolving 3GPP2 QoS framework, this will be based on ROHC);

Multiplexing of both EVRC/SMV voice packets & PPP data packets over a single GRE tunnel; and DiffServ support—DiffServ (re)marking & per-hop behavior (PHB) to distinguish uplink & downlink voice, SIP, and other data packets.

The Authentication, Authorization, & Accounting (AAA) Server 62 provides Authentication and Accounting functions for wireless data services. It supports Mobile-IP-based authentication based on user name and shared secret data, and maintains per-user packet counts for accounting purposes.

The Home Agent (HA) 18 registers the current point of attachment (i.e., current FA) of the mobile node, and tunnels IP packets to/from the current point of attachment. The HA 18 accepts registration requests using the Mobile IP protocol, and uses this information to update the current attachment point. Packets being sent to the mobile node's home address are intercepted and tunneled to the mobile's current location. The HA also supports reverse tunneling.

Finally, like the PDSN 60, the HA 18 is a fully compliant Diffserve edge node, supplying both (re-)marking and per-hop behavior.

Other elements in FIG. 3 have already been discussed in connection with FIG. 1. However, the following features should be additionally noted, which serve to reduce delays which could contribute to the user's perception of network responsiveness:

SIP compression is used between the MS 20 and the IMS proxy server 26, to reduce over-the-air transmission delays;

Over the air SIP messaging is minimized, as later depicted in FIGS. 5-12.

DiffServ marking of packets at layer 3 is provided by the IMS 26 and PTT Server 34, in order to enable differentiated treatment for voice, SIP signaling and other data;

802.1p priority is used at layer 2, by components of the managed IP network 16, in order to provide differentiated treatment of voice and SIP signaling.

Figure 4:
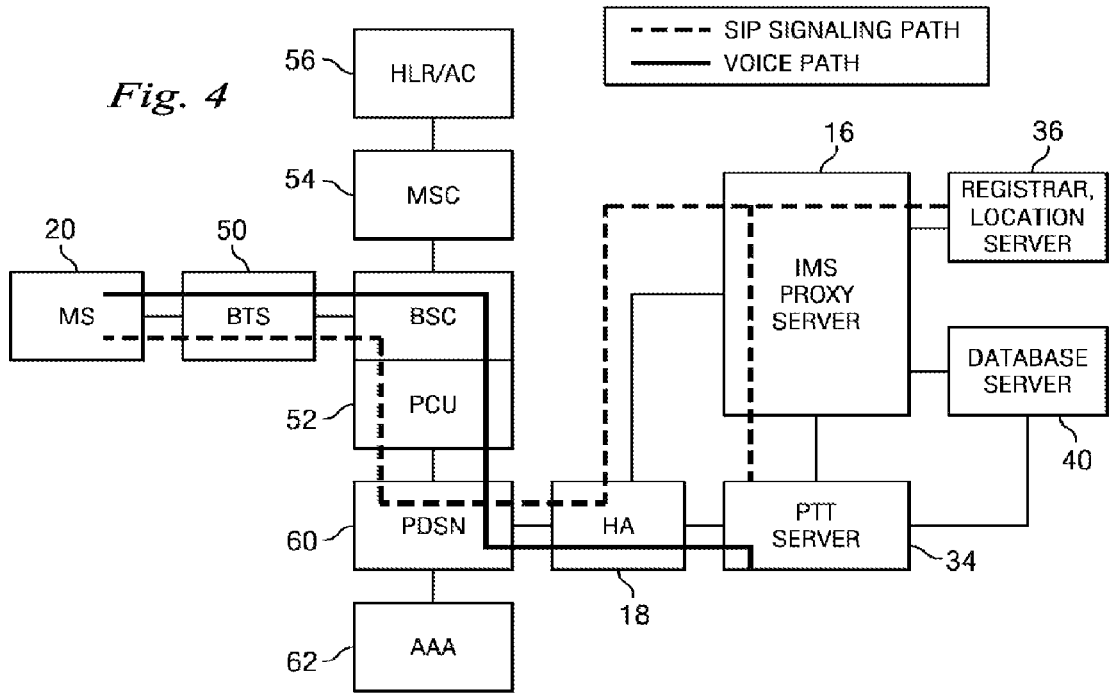
FIG. 4 illustrates a logical view of the architecture of the preferred embodiment.

Now turning to FIG. 4, the diagram depicts a more logical view of the network reference architecture, and shows the paths taken by SIP signaling (dotted line) and voice packets (solid line). SIP traffic (e.g. REGISTER request) goes from the MS 20 to the Registrar Server 36 through the BTS 50, the BSC 52, the PDSN 60, the HA 18, and the IMS Proxy Server 16. A registration signal is then sent to the PTT server 34. Similarly, the voice path from the MS 20 to the PTT Server 34 through the BTS 50, the BSC 52, the PDSN 60 and the HA 18.

Always On

For Push-to-talk users, a user's packet-data session is always in "connected-state". Although radio-link resources do not remain allocated to an inactive user, this fact is hidden from the user. The user does not have to do anything special to bring his radio-link connection back into active state, when needed. Hence a dedicated over-the-air traffic channel is automatically allocated for the user whenever there is need to send or receive packet-data. This is known as a Dormant to Active transition.

Instant Response

When the user is in Active state, responses to the user are delayed only by RAN packet propagation delay, and network and application delays. Nominal packet round-trip delays in RAN are usually very small (~250 ms under favorable RF conditions).

When a user is in Dormant state, the network response cannot be instantaneous because of Dormant-Active transition. User still can get immediate feedback regarding call-progress and failures.

Dormant-to-Active state transition requires allocating a traffic channel to the user and RLP synchronization between the user and the PCF. Delays inherently associated with IS-2000 call-setup procedures (used for dormant-to-active transition) put a limit on the instantaneousness of the user experience for initiating a PTT talk-spurt.

Dormant Terminating Mobiles

If all the mobiles in a group to which a Push-to-talk call terminates are dormant, the caller will experience additional delay during which at least one of the terminating mobiles is brought into Active state.

Network-initiated Dormant-to-Active transitions take longer due to additional delay due to paging.

If at least one of the terminating mobiles is in Active state, the caller will encounter no additional delays with respect to the network response.

Optimization of Dormant-To-Active Transition Delay

Delays associated with initial talk-spurt are minimized using the following approaches: (1) for mobile originated dormant-to-active transitions, early Channel Assignment can be used to assign a mobile to traffic-channel in parallel, with network resources are being allocated and prepared for the call, thus compensates for the over-the-air delays inherent with IS2000 call-setup; (2) for quicker terminations to mobiles, use of slot-cycle-index (SCI) of zero instead of higher values of SCI which conserve battery-life but increase paging time to the mobile (e.g. typical SCI value of 2 results in mobile listening to paging channel every 5.12 seconds). Using SCI=0, results in mobile listening to paging channel every 1.28 seconds instead. This reduces call-setup time accordingly. A 1×RTT mobile operating with SCI=0 should have a battery life of ~40 hrs with today's commercially deployed battery technology.

Call Flows

A subset of use cases is now described by way of call flows. The selected use cases include the following:

Registering for general SIP-based services, by which the user is enabled to participate in Direct Connect service;

Joining a closed group session;

Direct Connect call by user who is already active in a closed group session, where the group uses the peer-to-peer communication model (note that, for users already active in a group session using this model, a call & initial talker arbitration are identical);

Leaving a closed group session; and

Alert-initiated Direct connect call to an ad hoc group of three users. We depict both call setup, call refusal, & teardown. (Note that a one-to-one Direct Connect call is a degenerate case of an ad hoc group call.)

While not inclusive, the use cases selected for call flows are to provide an understanding of the general approach to providing a Push-to-talk solution at the application layer. However, other embodiments may modify the architecture represented in these call flows and still remain in the spirit of the invention.

Mobile-to-mobile, internet-to-mobile, & mobile-to-internet calls are not distinguished since the SIP-based, IP multimedia network solution should be largely independent of the underlying access network technology. Push-to-talk clients, on the other hand, must obviously be aware of the access network being used. This statement is particularly true for non-integrated or "split" terminals—e.g., a laptop (TE) with either a PCMCIA 1×RTT or 802.3 modem (MT), which would need to sense the type of modem in use & send EVRC/SMV circuit voice or EVRC/SMV VoIP respectively.

The following design constraints/goals were imposed on the design of the call flows:

To reduce over-the-air (OTA) transmission time for SIP signaling, and to eliminate connection oriented messaging, UDP should be used instead of TCP or SCTP for transport of signaling;

Compressed SIP/SDP messages must be exchanged with the 1×RTT access network, in order to reduce the OTA transmission time for SIP messages (the IMS proxy server will provide compression/decompression capability for downlink/uplink messages respectively);

As compression algorithms that maintain session history typically achieve better compression results than algorithms which maintain no state information, the IMS proxy server must be call-stateful rather than unstated or (transaction) stateful;

To optimize responsiveness of the Direct Connect service to the user, the number of necessary OTA SIP messages should be minimized, even at the expense of standards compliance;

The Direct Connect service solution provided in the Succession IMS network should be, to the greatest extent possible, decoupled from the 1×RTT radio access network (RAN) and core network (CN) (Such decoupling enables separate evolution of the application network and the 1×RTT RAN and CN);

A PTT server should not be allocated for a group until the first group member joins the group and thereby establishes a session with a PTT server (this constraint results in a more easily managed, robust & reliable network); and Consistent with the trend to push application-specific logic toward SIP endpoints, Direct-Connect-specific service logic should be pushed toward the terminals' client software, & toward the PTT server, & away from the SIP registrar & IMS proxy server.

Preconditions for the call flows include the following:

All depicted mobiles have already established a Mobile IP session with the home agent (HA), & hence have already established a PPP session with the PDSN. They have also obtained the address of the IMS proxy server via a DNS SRV query. As our focus in this section is on the part of the Direct-Connect solution provided by the IMS network, we abstract away the transport provided by the 1×RTT CN & RAN, & depict direct connectivity between the MS & both the PTT server for voice traffic & the IMS proxy server for SIP signaling.

All group URLs start with a reserved substring—e.g., "group"—to enable network elements to clearly distinguish group URLs from user URLs.

To facilitate IMS (application server) discovery of available PTT servers, each PTT server has registered its URL as a contact for the well known, generic, PTT server, pttserver@operator.com.

Each PTT server's URL's host name includes the server's IP address, to preclude subsequent DNS queries to resolve the server's address. (When a PTT server's load exceeds a provisioned threshold, it removes the registration; later, when loading falls below a provisioned threshold, the PTT server reregisters itself as a contact.)

Finally, we present call flows for the above selected use cases. Now turning to FIG. 5, a call flow is shown for a user registering with a registrar. Step 1—The user of $MS_1$ performs some action, e.g., powering up handset, activating some SIP-based service, etc., that requires the user to register with the SIP Registrar.

Step 2—The $MS_1$ sends a compressed REGISTER request to the Succession IMS network. We assume that the MS is at home—i.e., the From header's address domain is identical with the current network domain. The To header identifies the user for which a contact is to be registered; the From header identifies the party initiating the registration. In this case, they are the same. The host part of the Contact header's SIP URL is the IP address of the mobile that has been allocated from the home agent's (HA's) subnet.

Step 3—Upon receipt of the REGISTER request, the IMS proxy server decompresses the SIP/SDP payload, caches the MS's IP address, and requests the user's profile from the Subscriber database.

Step 4—The Subscriber Database returns the profile to the IMS proxy server, which performs any necessary authentication and, given an authenticated user, performs subscriber authorization (e.g., verifies that the subscription is paid up, etc.). The IMS caches the profile for later use.

Step 5—The IMS proxy server relays the REGISTER request to the SIP Registrar.

Step 6—The SIP Registrar registers user1@<MS's IP address> as a contact for user1@operator.com, and returns a 200 OK to the IMS proxy server. The 200 OK message includes an Expires header, which specifies the duration of the registration. This registration must be periodically refreshed.

Step 7—The IMS proxy server compresses the 200 OK and forwards it to the MS.

Figure 6:
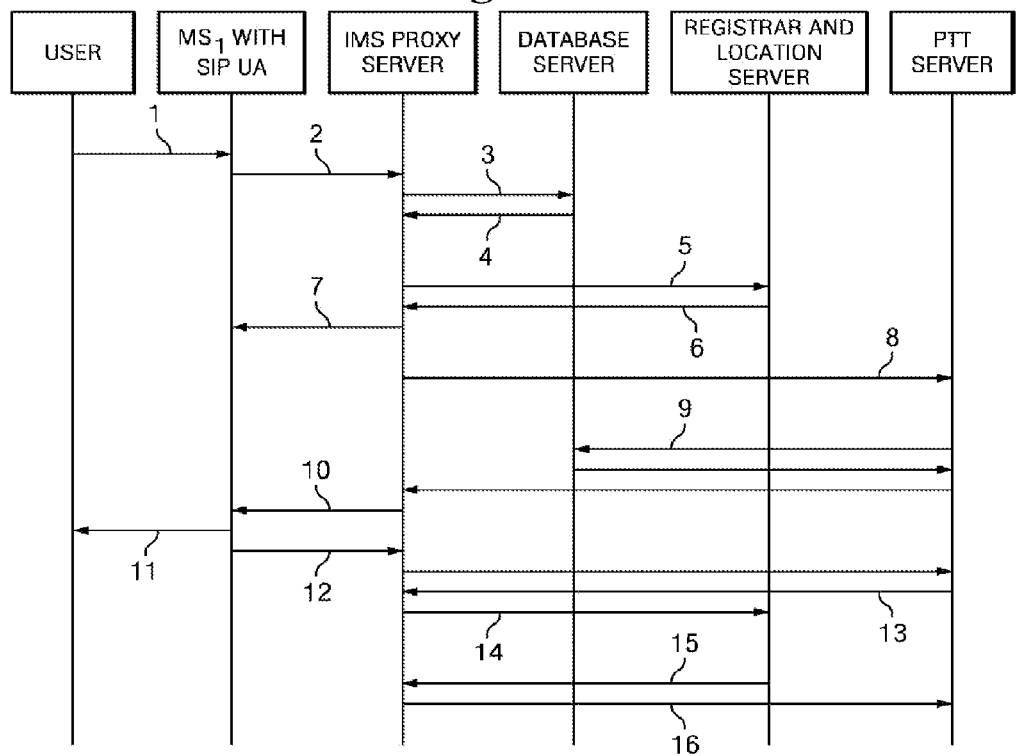

Now turning to FIG. 6, a call flow is shown on Joining a Closed Group Session. As preconditions for this call flow, the following assumptions are made: another user (e.g., the user of $MS_2$) has already joined closed group groupID1@operator.com; and the depicted PTT server has been allocated to serve groupID1@operator.com.

This call flow describes how a user joins a group, & may be abstracted into two stages:

Steps 1-12—joining the group, by establishing a session (via the INVITE method) with the PTT Server; and Steps 13-16—registering as a contact for the user the group's SIP URL, so that any subsequent ad hoc group calls/alerts will be routed via the PTT server to the user. By such routing, acceptance of a call of this sort may result in the user leaving the original group session prior to RTP packet distribution for the new call. (Without this, the user could simultaneously receive voice packets from two different calls.)

At startup, the SIP Registrar established a registration of pttserver@operator.com as a contact for each provisioned, open or closed group, including groupID1@operator.com, the closed group involved in this call flow. Such registration facilitates dynamic assignment of a PTT server for a group. When the first group member joined a group—e.g., in this case the user of $MS_2$ joining groupID1@operator.com—the IMS proxy server queried the location server for the group's registered contact. Since the contact was the well-known, generic, PTT server URL, pttserver@operator.com, signifying that no PTT server had been assigned for the group, the IMS queried the location server for the active PTT servers that were registered as contacts for this URL, unless the IMS had already cached this information. The IMS selected one of the registered PTT servers' contact URLs, and relayed the joining user's INVITE to the selected server. This PTT server, in turn, registered its URL as the preferred contact for the group.

Note that the conventional order of REGISTER followed by INVITE has been inverted. However, the conventional order could be followed with the consequence of longer delay before the user is enabled to participate in group calls.

Step 1—Explicitly via MMI at the mobile station ($MS_1$) or, alternatively, implicitly and automatically via MS power-up, the user activates the Push-to-talk client, and identifies groupID1 as the group to be joined.

Step 2—The SIP-based, Push-to-talk client in the MS sends a compressed INVITE request to the proxy server. The From header identifies user1@operator.com as the user's SIP URL. The To header identifies the SIP URL of the group to be joined (i.e., groupID1@operator.com). The Contact header identifies the MS's IP address in the host portion of the URL. Normally, the Contact header would provide the IP address of the user so that subsequent requests may be sent directly to the user's terminal, instead of through a series of SIP proxy servers. As the SIP compression/decompression function is allocated to the IMS proxy server, and as the compression algorithm is session-stated (in order to enable better compression results), all signaling traffic from mobiles must transit the proxy server. Record-Route & Route headers are used to force subsequent SIP messages related to this session through the same IMS proxy server. The Proxy-Require header indicates that the proxy-server must support Push-to-talk-specific processing. The Session Description Protocol (SDP) body identifies the MS's IP address and RTP port number to which EVRC/SMV voice packets should be sent.

Step 3—Upon receipt of the INVITE request, the IMS proxy server decompresses the SIP/SDP payload, and parses the SIP/SDP headers. Finding that the Proxy-Require header necessitates support for Push-to-talk, the proxy server permits Push-to-talk-specific extensions to the SIP protocol. The IMS caches the MS's IP address, & requests the user's profile from the Database Server.

Step 4—The Database Server returns the profile to the IMS proxy server, which performs any necessary authentication. Given an authenticated user, the proxy server performs general subscriber authorization (e.g., verifies that the subscription is paid up, etc.) and, given that the Proxy-Require indicates support for Push-to-talk, verifies that the user subscribes to some form of Push-to-talk service. The IMS caches the profile for later use.

Step 5—The proxy server queries the location server regarding the location of groupID1@operator.com.

Step 6—Within the location server, the groupID1@operator.com URL has been registered with a contact list comprised of the URL of the PTT server serving groupID1. The location server thus sends this URL in response to the proxy server. The contact URL includes the IP address of the PTT server.

Step 7—The proxy server caches groupID1's PTT server address, and sends a compressed 100 Trying to the MS.

Step 8—The proxy server then relays the INVITE request to the PTT server, replacing the Request-URI with the URL of the PTT server. The protocol exchange between the proxy server and the location server would be unnecessary if the proxy server had already cached the address of the PTT Server serving groupID1.

Step 9—The PTT server queries the database server for user1's groupID1 membership data, and caches this for later use. The PTT server functions as a SIP back-to-back user agent (BBUA), distributes received speech packets, and provides talker arbitration. It now modifies data structures that facilitate these functions. The PTT server adds the MS's IP address & RTP port number to the "multicast group" associated with groupID1, adds the user's SIP URL to a list of users who've joined group groupID 1, establishes a mapping from the user's SIP URL to $MS_1$'s IP address and RTP port number, and returns a 200 OK to the IMS SIP proxy with an SDP message body specifying the PTT server's IP address & groupID1's RTP port number to which the PTT-service client should send voice packets. Note that the 1× technology is presently inadequate to support IETF-specified multicasting with Class D multicast addresses. While 3GPP2 has discussed supporting IP multicasts, it is unlikely to address such in the near future. The PTT Server, therefore in this embodiment effectively "multicasts" received speech packets by replicating received packets for each group member (other than the packet originator), replacing the group-specific, unicast, destination IP address & RTP port number with the individual IP address & RTP port number of each member, and forwarding the modified packets to group members. Thus, "multicast group" does not here refer to an IP multicast group, but rather to an ad hoc association between both the PTT server's (unicast) IP address & group-specific RTP port number and the IP addresses & RTP port numbers of active group members.

If this is the first received INVITE for groupID 1@operator.com, the PTT Server allocates a speech token, members' SIP-URL list, and group-specific RTP port number, saves the association between the group and token/list/port-number, and assigns the token a status of available. In this message flow at least one other member is assumed to have already joined the group.

Step 10—The IMS SIP proxy compresses & forwards the 200 OK to $MS_1$.

Step 11—$MS_1$ decompresses the 200 OK. Via the MMI, the $MS_1$ advises the user that the user successfully joined groupID1. The MS also saves the PTT server's IP address & the group's RTP port number from the received SDP. The user has joined group groupID1, and will now participate in any in-progress & subsequent group calls.

Step 12—The MS sends a compressed ACK to acknowledge receipt of the 200 OK. The IMS proxy server decompresses the ACK & forwards it to the PTT server.

Step 13—Upon receipt of the ACK, the PTT server, on behalf of the user, performs a $3^{rd}$-party registration. The PTT server sends a REGISTER request, identifying the groupID1 SIP URL as the location at which the user may be reached. (Normally, a SIP client would register on his/her own behalf. The PTT server initiates 3rd party registration to reduce the over-the-air messaging and consequent delay to achieve the registration.)

Step 14—Upon receipt of the REGISTER request, the proxy server recognizes the PTT server (identified in the From header) as a trusted entity, & skips any normally performed authentication & authorization. The proxy server relays the REGISTER request to the SIP Registrar.

Step 15—The SIP Registrar registers groupID1's URL as a contact for user1@operator.com, where the host portion of the URL includes the PTT server's IP address, and returns a 200 OK to the IMS proxy server. The 200 OK message includes an Expires header, which specifies the duration of the registration. By virtue of this registration, push-to-talk calls/alerts placed from outside the group to the user will be relayed via the PTT server to the user, so that acceptance of a call of this sort may result in the user leaving the original group session. This registration must be periodically refreshed. (This contact registration is additive with respect to prior registrations. The contact headers and parameters may be used to give the group contact higher priority than prior registrations.)

Step 16—The IMS proxy server relays the 200 OK to the PTT server.

Figure 7:
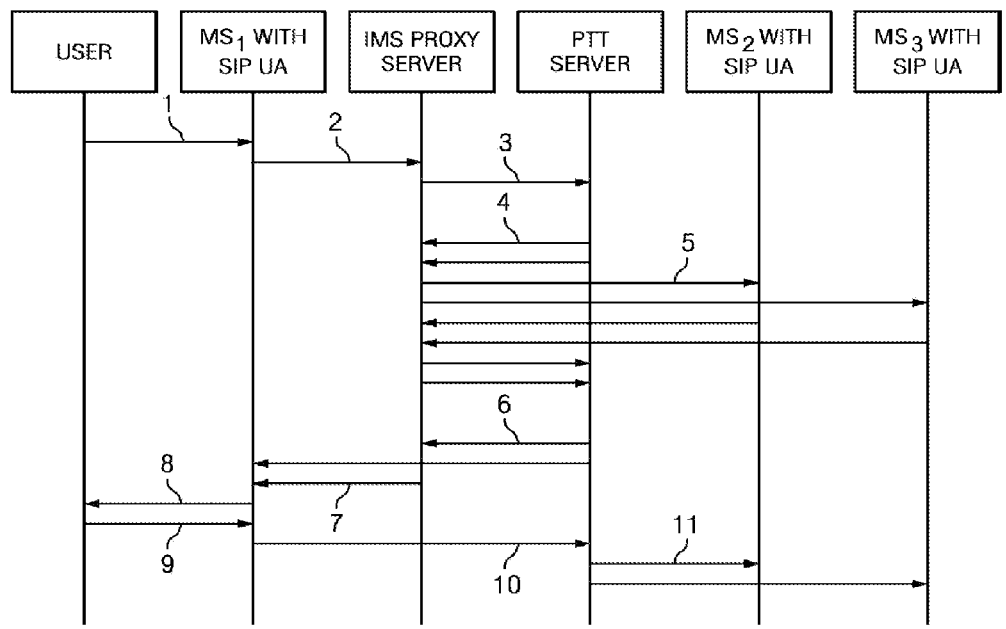

Now turning to FIG. 7, a call flow is shown for a push-to-talk Call (or Talker Arbitration) for an already active group member. This call flow explains how an active group member places a group call. (An active member is one who has already joined the group session.) Note the efficiency of group call setup relative to conventional SIP-based telephony (which would require three SIP messages at a minimum exchanged with each member of the group). Having already indicated in the previous call flows the use of the Proxy-Require header, how the IMS proxy server authenticates/authorizes the user, and how the MS and the IMS proxy server compress SIP messages over the air, such details are omitted in this and subsequent call flows. Preconditions of this call flow include the following: three mobile users have already joined group groupID1, who relate per the peer-to-peer communication model; and the IMS proxy server has already cached profile & location information for all three users.

Step 1—The user of $MS_1$ presses the PTT button to place a group call.

Step 2—the $MS_1$ sends a SUBSCRIBE request to the proxy server, requesting the groupID1 speech token. The SUBSCRIBE method to request and release the speech token for a group is used. The To header identifies the group as groupID1@nextel.com; the Contact header identifies user1@nextel.com as the requestor, and also the grantee of the token in the event that it is granted. Note that the From header includes the display name, which will be ultimately used to satisfy the requirement to display the name of the call originator. The Event header specification of speech token, with qualifying parameter of status=requested, identifies this as a speech-token request. A zero value for the Expires header signifies that a subscription should not be queued; rather, the resource status should be immediately reported.

Step 3—The proxy server forwards the SUBSCRIBE request to the PTT server serving groupID1.

Step 4—The PTT server parses the SUBSCRIDE message, and verifies that the groupID1 group is currently being served, that user1 has joined groupID1, and that user1 is authorized to speak within the group. Authorization to speak, whether or not the user has special privileges within the group, etc. is all contained in the user's membership data that was downloaded from the database server in the previous call flow. The PTT server now checks the status of the speech token that has been allocated for groupID1. If the speech-token status were already "taken"—this would occur when another user had pressed his/her MS's PTT first and had not yet released it—the PTT server would send to user1@operator.com a 200 OK that indicated this status, and would not queue the request for the speech token since the SUBSCRIBE request's Expires header indicates a subscription duration of zero. As the token is available, the PTT server saves user1@operator.com as the grantee of the groupID 1 speech token, and sends to the users of $MS_2$ & $MS_3$ a NOTIFY message that identifies the call originator. Associated with each open & closed group is an inactivity timer. Whenever the speech token is released, the timer is (re)set to a provisioned value. If the timer expires before a new request for the group's speech token is received, then the current call is considered to have ended, and any next request for the token starts a new call. The PTT server checks whether the timer has expired upon receipt of a speech token request. If so, the PTT Server will convey the display name of the call originator to target users, and must receive at least one response (per our assumption noted in the response to R8) before granting the speech token to the requestor; otherwise, to conserve system capacity, it will not convey the display name of the speaker to other group members, and will immediately provide speech token status to the requestor. The INFO method could also be used to convey the identity of the call originator. Conveying the status of the subscribed resource in the SUBSCRIBE's 200 OK is an optimization over what is specified in draft-roach-sip-subscribe-notify-03. The present embodiment disallows the Event header in the SUBSCRIBE 200 OK, specifies that the 200 OK should simply indicate acceptance of the subscription, and requires a subsequent NOTIFY request and response to convey the status of the subscribed resource. The NOTIFY method is dispensed in this call flow, and thus "optimized away" two messages over the air and thereby shortened call-setup delay.

Step 5—The IMS proxy relays the NOTIFY requests to $MS_2$ and $MS_3$. The request recipients display the identity of the call originator & respond with a 200 OK, which the IMS proxy server relays to the PTT server.

Step 6—Upon receipt of the first NOTIFY 200 OK, the PTT server sends the SUBSCRIBE 200 OK conveying "token granted" status. The alternative of having the 200 OK stimulating the MS to play a mobile-generated tone was considered, however, since in other contexts using SIP signaling to stimulate tones would adversely affect system capacity, it was decided to uniformly use RTP to convey tones from the PTT server to MSs. The PTT server also sends an RTP packet conveying the "token granted" tone to $MS_1$, so that the mobile may play the tone to the user.

Step 7—The IMS proxy server relays the 200 OK to user of $MS_1$.

Step 8—The $MS_1$ receives both the tone-bearing RTP packet and the 200 OK. $MS_1$, consequently, notifies the user (e.g., via audible tone) that he has been granted the right to speak. If the speech token were already taken (versus granted), a different audible tone would be sounded, releasing the PTT button would not result in any SIP messaging, and the user returns to Step 1 if he still wishes to obtain the right to speak.

Step 9—The user speaks.

Step 10—The $MS_1$, vocodes the speech using its EVRC/SMV codec, and sends voice packets to the PTT server.

Step 11—The PTT server receives the voice packets. For each active member of the group (other than the packet originator), the server replaces the destination IP address and port number of each packet with the member's address and RTP port number, and sends the modified packet to the member.

Figure 8:
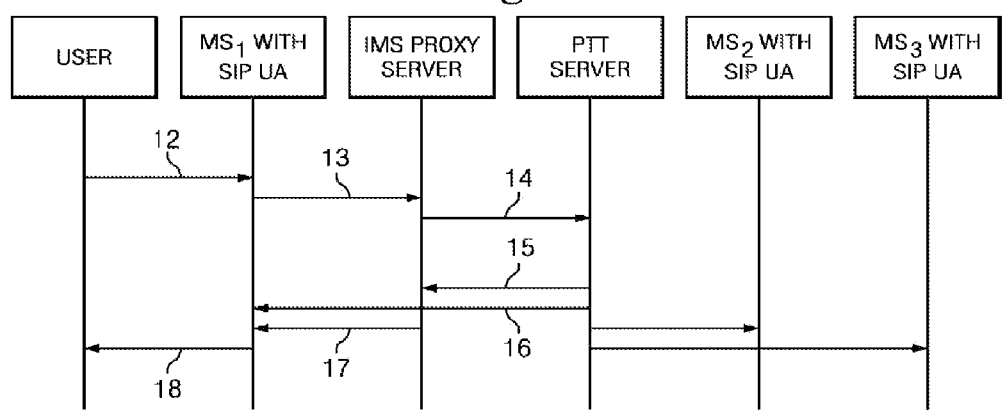

Now continuing on to FIG. 8, Step 12—The user releases the PTT button.

Step 13—The $MS_1$ sends a SUBSCRIBE request to the proxy server, in order to release the groupID1 speech token.

Step 14—The IMS proxy server forwards the request to the PTT server.

Step 15—The PTT server parses the SUBSCRIBE message, verifies that the groupID1 group is active and that user1@operator.com has been granted groupID1's speech token. Then the PTT server changes the speech-token status to "available," sends to user1@operator.com a 200 OK that indicates "available" status for the speech token, and clears storage related to speech-token grantee identification.

Step 16—The PTT server also sends an RTP packet conveying "token available" status to each MS in the group session.

Step 17—The proxy server relays the 200 OK to $MS_1$.

Step 18—Upon receipt of the RTP packet, which may arrive before the 200 OK in the case of $MS_1$, each MS audibly notifies its user that the speech token is available.

Figure 9:
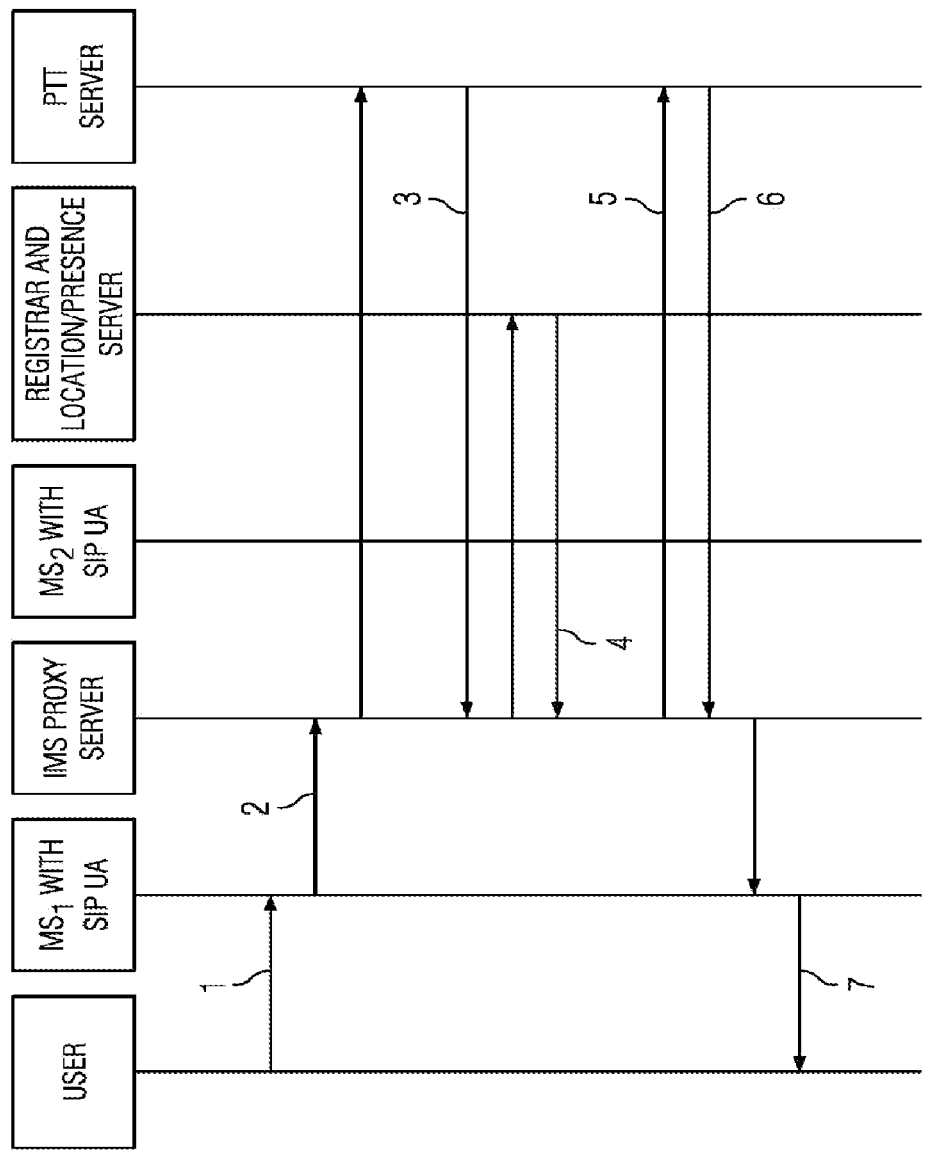

Now turning to FIG. 9, a call flow is shown where a user leaves a closed group session. This call flow depicts a user leaving a closed group session that the user previously joined. Preconditions for this flow include the following: the IMS proxy server has already cached profile & location information for the user; and the IMS proxy server has already cached the IP address of the PTT server serving the groupID1.

Step 1—The user indicates via the MMI that the user wishes to leave the previously joined session for group groupID1.

Step 2—The Push-to-talk client in $MS_1$ sends a BYE request, which the IMS proxy server relays to the PTT server.

Step 3—On behalf of the user, the PTT server sends a third-party REGISTER request with an Expires header value of zero, in order to remove $MS_1$'s registration of groupID1@operator.com as a contact for user1@operator.com. The IMS proxy relays the REGISTER request to the SIP Registrar.

Step 4—Finding the Expires header with value of zero, the SIP Registrar removes the registered contact for user1@operator.com, and returns a 200 OK to the IMS proxy server.

Step 5—The IMS proxy server relays the 200 OK to the PTT server. The MS will no longer be reached for ad hoc group calls via the proxy server.

Step 6—The PTT server effectively removes the user from the group. The server removes the $MS_1$'s IP address & RTP port number from the set of such user tuples associated with groupID1, removes the user's SIP URL from the list of users who've joined group groupID1, removes the mapping from the user's SIP URL to the MS's IP address, and returns a 200 OK to the SIP proxy server. If $MS_1$ were the only active member of groupID1, the PTT server would de-allocate the group's speech token, the group's SIP-URL member list, & the group's RTP port number, and would remove the mapping from group ID to token/member-list/port-number. The user of $MS_1$ no longer participates in group calls. The proxy server relays the 200 OK to $MS_1$.

Step 7—Upon receipt of the 200 OK, $MS_1$ indicates to the user that the user has left the groupID1 session.

Figure 10:
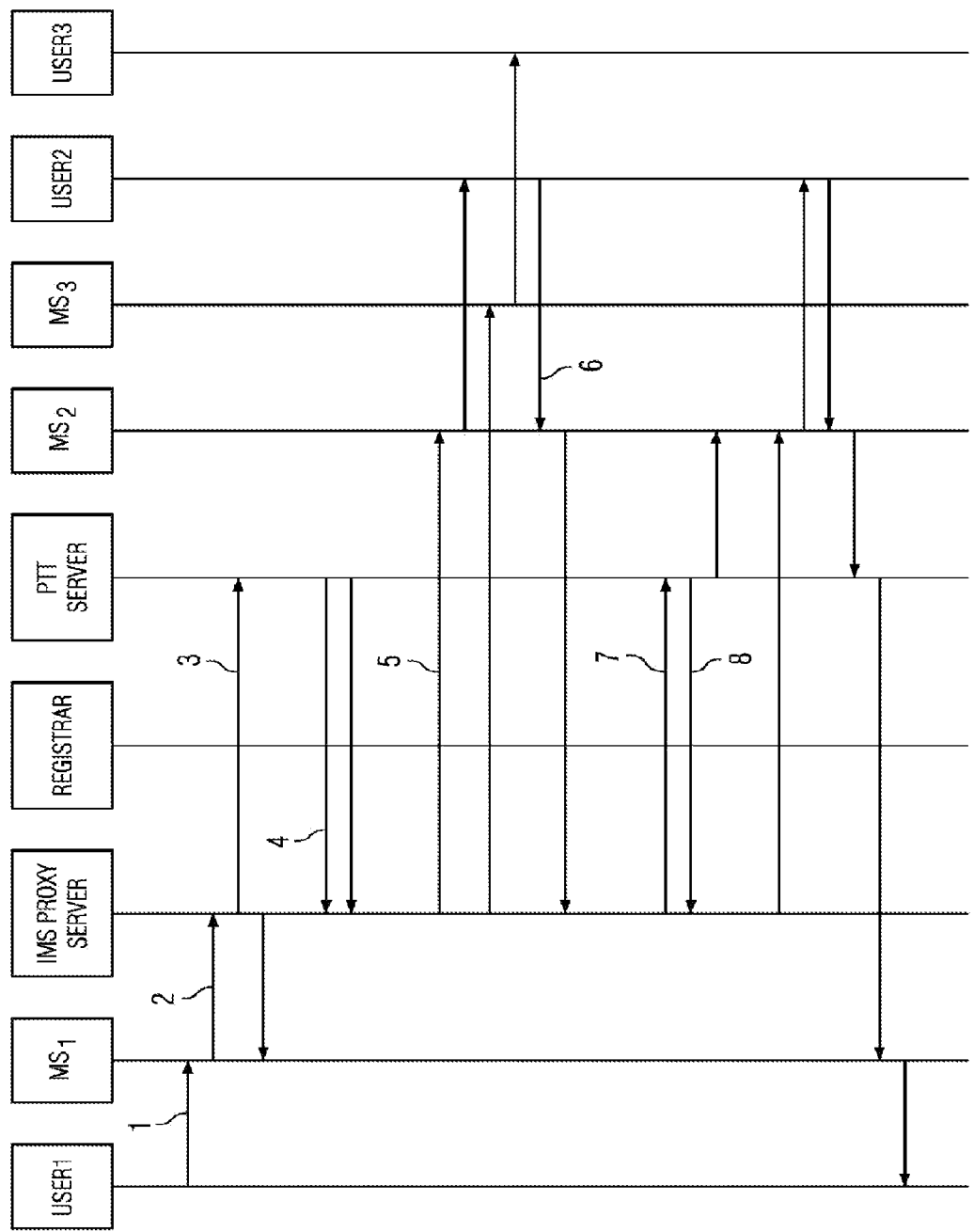

Now turning to FIG. 10, a call flow is shown for an alert-initiated, push-to-talk call. The following call flow depicts an alert-initiated Direct connect call involving three users, who comprise an ad hoc group. Both a call setup and a call teardown is shown. In addition to the preconditions identified for all call flows above, this flow specifically has the following preconditions: (1) all users have registered (as exemplified in FIG. 6); (2) the IMS proxy server has cached profile data and contact information for each user; (3) to expedite call setup for ad hoc group calls, each active PTT server has already registered with the Registrar a set of unique, ad hoc group URLs, with the contact for each URL being the PTT server's URL. Additionally, the host portion of the PTT server's URL includes the IP address of the PTT server, so as to eliminate the need to do a DNS query to resolve the server's address. These registrations will be needed to route all alerts/calls intended for users currently participating in an ad hoc group call to the PTT server supporting that call (in the event that a user participating in an ad hoc group call decides to join still another call, the PTT server supporting the original call must cause the user to leave the current call, lest RTP packets from both calls be delivered to the user and result in garbled speech); (4) moreover, at startup, the SIP Registrar established a permanent registration of pttserver@operator.com as a contact for the well known, generic, ad hoc group, groupadhoc@operator.com. This registration enables dynamic assignment of a PTT server for an ad hoc call. Further, the IMS proxy server has already cached the registered contacts (i.e., URLs of available PTT servers) for pttserver@operator.com.

The call flow may be analyzed into the following stages: Steps 1-5—alerting the target users; Steps 6-12—targeted user responds to the alert by pressing the PTT button and placing a Push-to-talk call; Step 13—another targeted user declines to participate in the call; Step 14—talker arbitration between call participants; and Step 15—the resulting ad hoc group call is torn down due to inactivity timer expiration.

Step 1—The user of $MS_1$ selects the users user2@operator.com & user3@operator.com as the targets of an ad hoc group alert.

Step 2—The $MS_1$ sends an INVITE request with the To header identifying the well known, ad-hoc group name groupadhoc@operator.com. Conventional SIP restricts the To header to identifying exactly one party. To circumvent this restriction, since two parties are to be alerted, multipart MIME is used. Multi-part Multipurpose Internet Mail Extension (MIME) is described by publicly available RFC 2046. The body of the INVITE request has two segments: SDP specification of the EVRC/SMV codec & of the sending user's IP address & RTP port number; XML specification of the URLs that should comprise the ad hoc group. PTT clients & PTT servers must use a common Document Type Definition (DTD) to define the members of an ad hoc group. Resulting XML-based specifications of group members may include the following: a list of constituent group URLs & individual users' URLs (with home domain name included); identification of the group administrator (i.e., the alert originator); the administrator's preference as to whether other call participants may invite others into the group call. The From header identifies the originator's SIP URL. The Remote-Party-ID header indicates the alerting party's display name & SIP URL to be presented to the target users. The Contact header identifies, in the host portion of the URL, the MS's IP address. The Date header identifies the time of the alert. Independent of the requirement to provide timestamp for alert messages, the Date header should be included in all SIP messages sent by the network to a mobile. MSs may thus detect "overly aged" SIP messages and handle them appropriately. The Subject header provides the means for the sender to convey an optional, customized alert message to the receiving users. The Require header specifies alerting of other group members not already in the session—for an ad hoc group, this is all other group members specified by XML in the message body—and inviting them to join the group session.

Step 3—Upon receipt of the INVITE request, the IMS proxy server finds that it has (from a previous Location Server query) already cached pttserver@operator.com as the contact for groupadhoc@operator.com. The proxy server also finds that it has cached a list of URLs of available PTT servers as the contacts for pttserver@operator.com. The IMS proxy server selects the URL of one of the available PTT servers, forwards the INVITE to that PTT server, & sends a 100 Trying to $MS_1$).

Step 4—Based on groupadhoc@operator.com in the To field, the selected PTT server recognizes this INVITE request as being related to an ad hoc group. The server selects, from among the ad hoc group URLs associated with the server, a currently unused URL—e.g., groupadhoc1@operator.com. The server then parses the XML specification of group members to obtain the list of members' URLs, associates the list with groupadhoc1@operator.com, marks user1@operator.com as having joined the group, & marks the other members as not having joined the group. If a group URL were specified as part of the ad hoc group, then the PTT server would query the Directory Server to obtain URLs for the constituent members of the specified group. It then allocates and associates with the group both a speech token (marked as available) & an RTP port number. The PTT server creates the (empty) set of members' IP addresses & RTP port numbers, places user1's IP address & RTP port number (from the SDP) into this set, and creates a mapping from the user's URL to this address & port number. Note that the PTT server functions as a back-to-back user agent (BBUA). To each group member other than the sender of the original INVITE request, the PTT server sends (as a user agent client or UAC) an INVITE request that differs from the original only in the following respects: the To header specifies the target member's URL; the From header identifies groupadhoc1@operator.com as the alert originator; the Contact header specifies groupadhoc1's URL, with the host name portion of the URL designating the PTT server's IP address; the SDP specifies the PTT server's IP address & the ad hoc group's RTP port number.

Step 5—The IMS proxy server relays the INVITE requests to $MS_2$ & $MS_3$, which each alerts its user regarding the invitation to participate in the ad hoc group call. For example, a user may be alerted audibly (e.g., a tone) or mechanically (e.g., vibration) of the alert, and the associated displayed alert text would include, at a minimum, the display name of user1, the timestamp from the Date header, and any Subject header text.

Step 6—The user of $MS_2$ immediately responds by pressing the PTT button, resulting in $MS_2$ responding to the INVITE request with a 200 OK. The 200 OK contains SDP that specifies the EVRC/SMV codec, $MS_2$'s IP address, and the RTP port number to be used in voice packets that may be sent to $MS_2$. The Remote-Party-ID header identifies the calling party's name, "John" in this call flow. The Contact header includes the user's IP address. The Event header in the 200 OK indicates that user2@operator.com requests the speech token. The SUBSCRIBE method was previously used in conjunction with the Event header, to request the speech token for a member that has already joined the group session. For one who has not joined the group session, INVITE must be used. Per the appropriate standards, INVITE requests (& INVITE 200 OK for alert-initiated calls) cannot contain the Event header, & use of a subsequent SUBSCRIBE method to request the speech token violates our design constraints to minimize over-the-air messaging & reduce call-setup delay. If the signaling is restricted to one SIP method only, the options are rather ad hoc in nature. One approach is to follow the lead of 3GPP (for network-initiated deregistration) & warp the semantics of the Allow-Events header to signal implicit event subscription (versus the IETF semantics of the sender allowing subscription for the specified events). This approach would at least be consistent with some standard for implicit subscription. Alternatively, the Require header could be used to implicitly subscribe to the speech token, use Event header information, use the message body (e.g., place Event header therein), introduce a new Subscribe header that allows piggybacking of SUBSCRIBE semantics onto the INVITE method or wholly encapsulate the SUBSCRIBE request in the body of the INVITE request or INVITE 200 OK. Once the speech token request is signaled, a separate NOTIFY to grant the token is precluded. (3GPP uses the NOTIFY method to explicitly provide the implicitly subscribed information regarding network-initiated de-registration.) Again, options to grant the speech token include use of the Require header, Event header, the message body, or a new Notify header that piggybacks the semantics of NOTIFY onto the INVITE & ACK methods. The disadvantages of using the Require header is that use of Require is typically domain specific (e.g., specific to Nextel domain), and does not lend itself well to interoperability. Use of the Event header, while optimal in maintaining consistency with its use in the SUBSCRIBE method, would likely not be approved by the IETF for inclusion in the INVITE method. Use of the message body (possibly with Event header-type text), would suffer from the same disadvantage. New headers to piggyback event-subscription semantics onto the INVITE & ACK methods should be further explored, but are not hopeful that this approach will find traction in the IETF. Thus, the present embodiment opted to use the Event header both to subscribe to the speech token (in the INVITE request when the calling party requests the speech token or in the 200 OK when the alerted party requests the token), and to grant it (in 200 OK when the calling party requests the speech token, and in the ACK when the alerted party requests the speech token). A less efficient, but standards-compliant solution, would employ separate INVITE, SUBSCRIBE, and NOTIFY methods, with resulting increased call-setup delay.

Step 7—The IMS proxy server relays the 200 OK to the PTT server.

Step 8—The PTT server now performs distinct processing related to each of the three members of the ad hoc group, spawning three parallel signaling threads that start in this step, Step 10, and Step 12. For user2@operator.com, the PTT server marks user2@operator.com as having joined the group, adds the user's IP address & RTP port number (from the received SDP) to the set of such maintained for members who have joined the group session, and creates a mapping from the user's URL to his/her IP address & RTP port number. The PTT server sends an ACK, with the Event header indicating to $MS_2$ that its user has been granted the speech token, and also sends an RTP packet with the token-granted tone to $MS_2$. The IMS proxy server relays the ACK to $MS_2$, which notifies the speaker (e.g., via audible tone) that the user may speak. Accordingly, the user begins to speak, and the PTT server distributes the resulting voice packets to all other users who have joined the session (i.e., in this case just user1).

Figure 11:
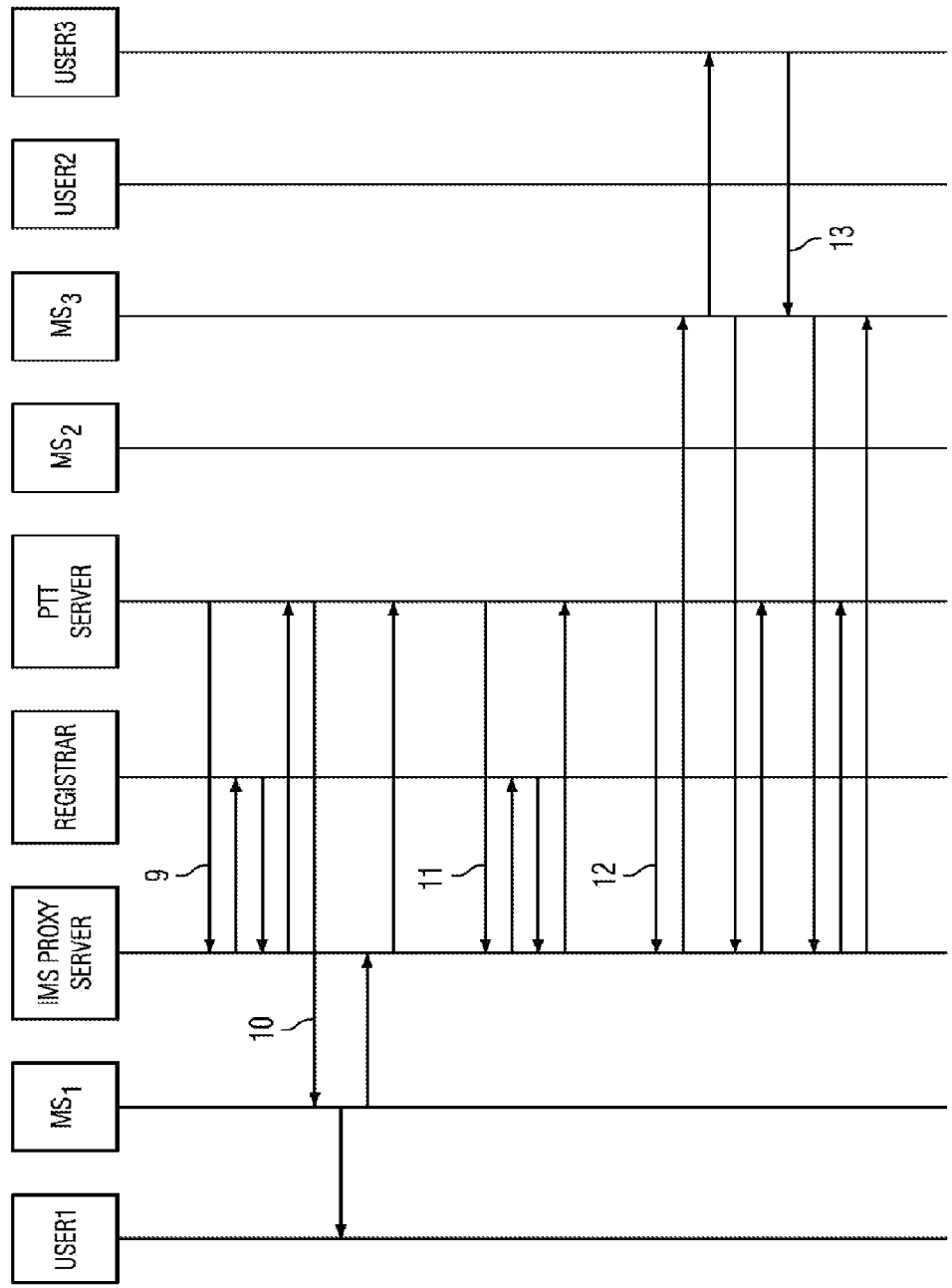

Now continuing on to FIG. 11, Step 9—In parallel with the PTT server's ACK transmission of Step 8, The PTT server also sends a $3^{rd}$-party registration on behalf of user2. The REGISTER request identifies groupadhoc1 as a contact for the user. The IMS proxy server relays the REGISTER request to the registrar. The registrar registers the contact, & returns a 200 OK via the IMS proxy server.

Step 10—This step occurs in parallel with Step 8. For user1@operator.com, the PTT server (as BBUA) sends a 200 OK final response to the original INVITE request, signifying that one of the targeted users has joined the call. The Contact header identifies the allocated ad hoc group URL. The allocated ad hoc group URL would be needed in order for the originator of the alert to expand the group membership and invite others into the call. The SDP specifies the EVRC/SMV codec, the PTT server's IP address, and the group's RTP port number. The Remote-Party-ID header identifies "John," or user2@operator.com, as the calling party. The IMS proxy server relays the 200 OK to $MS_1$. $MS_1$ notifies the user that user2@operator.com (i.e., "John") has been granted the speech token (the 200 OK with caller identification will generally arrive prior to any voice packets, as both must be transmitted by the PTT server to $MS_1$, and the server first sends the 200 OK), and sends an ACK. The IMS proxy relays the ACK to the PTT server.

Step 11—In parallel with the PTT Server sending the 200 OK in Step 10, The server sends a $3^{rd}$-party registration on behalf of user1, identifying groupadhoc1 as a contact for the user. The IMS proxy server relays the REGISTER request to the registrar, and the 200 OK from the registrar to the user.

Step 12—This step occurs in parallel with Step 8. To user3@operator.com, the PTT server sends a NOTIFY request that indicates that "John," or user2@operator.com, is the calling party. The IMS proxy server relays the message to $MS_3$, which clears any audible or mechanical (e.g., vibrating) alert, & updates the alert display to indicate that a call is in progress. $MS_3$ returns a 200 OK (with the Cseq header indicating that the response is for the NOTIFY rather than for the INVITE).

Step 13—the User3, noting that someone else has already responded to the alert, clears the alert at his/her terminal, which sends a 603 (Decline) final response. If no targeted user had responded to the alert in any way prior to expiration of a timer in the targeted MSs' Direct Connect applications, recipients of the INVITE would send a provisional response of 100 Trying, in order to prevent re-transmission of the INVITE by the PTT server. The IMS proxy server relays the response to the PTT server, and returns an ACK to MS₃.

Figure 12:
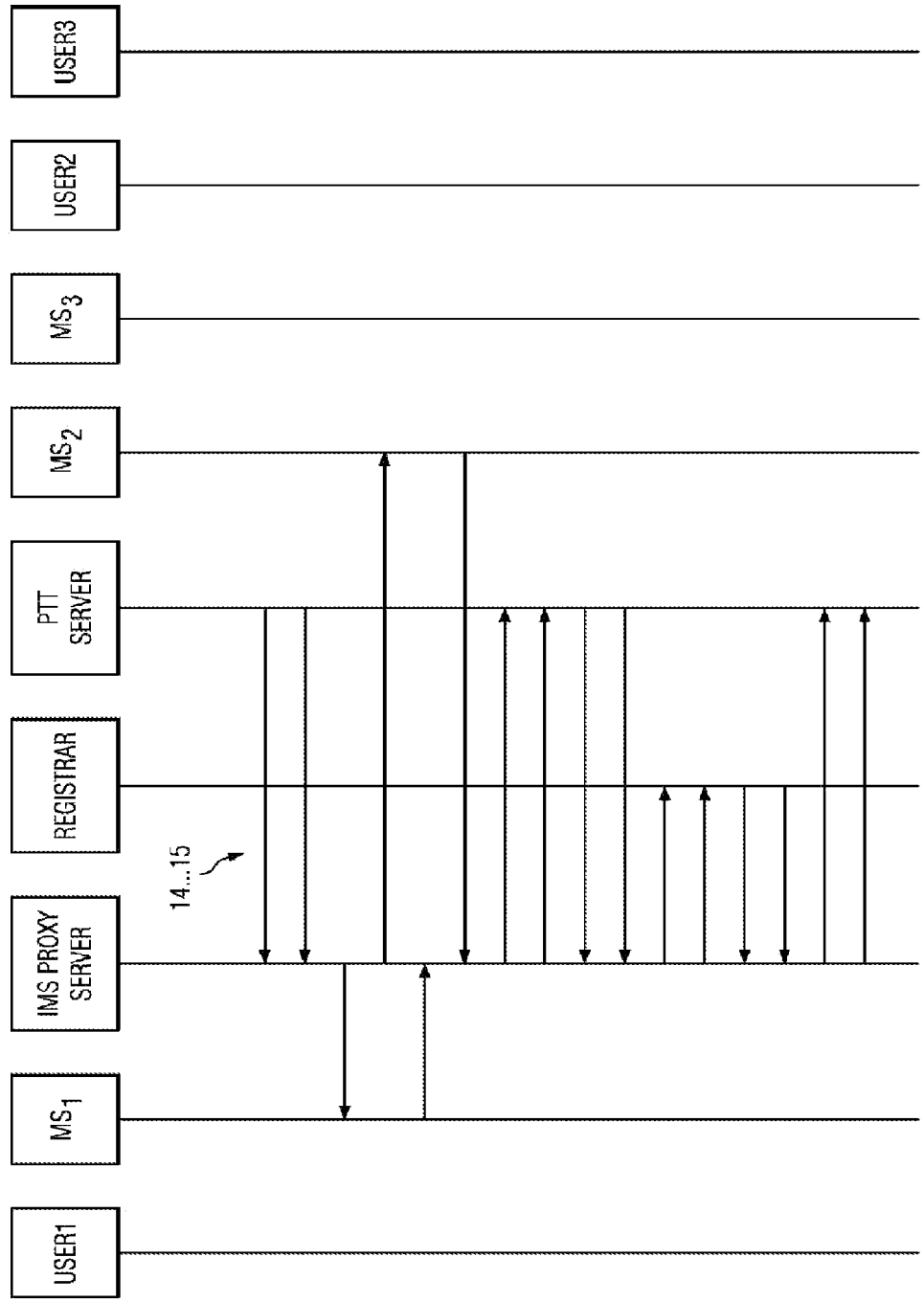

Now continuing on to FIG. 12, Step 14—In the meantime, talker arbitration and conversation occur between the two users in call, following the pattern of a prior call flow (that depicts the SUBSCRIBE method to release and request the speech token). The last speaker releases the speech token.

Step 15—Each time the speech token is released by any ad hoc group call participant, the PTT server (re)starts an inactivity timer. As the call participants have completed their conversation, the timer finally expires. The PTT server sends a BYE request to each user (via the IMS proxy server), removing them from the group session. When the users respond (via the IMS proxy server) with a 200 OK, the PTT server sends REGISTER requests to remove the registration of groupadhoc1@operator.com as a contact for the users. The IMS proxy server relays the requests to the registrar, which removes the contacts and returns 200 OKs. The IMS proxy relays these final responses to the PTT server, which dissolves the group membership, and de-allocates the group URL and associated RTP port number. To avoid certain race conditions, the group URL and associated RTP port number should be "rested" for some time before being used for another group.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed:

1. An apparatus for establishing an ad-hoc push-to-talk (PTT) call between users in a wireless communications network, the apparatus comprising:
   a module including a network interface and a processor;
   wherein at least one of the network interface and the processor are configured to:
      receive, via a session initiation protocol (SIP) server, a first SIP INVITE request from a mobile communication device, the first SIP INVITE request comprising one or more addresses of one or more parties invited to participate in the PTT call, wherein the one or more addresses comprise a first address of a first party;
      in response to the receiving the first SIP INVITE request, exchange invitation messages with the first party, via the SIP server, wherein at least one of the messages comprises an invitation to the first party to participate in the PTT call;
      receive, via the SIP server, a first response message from the first party, wherein the first response message is responsive to the invitation to the first party; and
      in response to the receiving the first response message, exchange additional response messages with the mobile communication device, via the SIP server, to indicate to the mobile communication device that at least one of the one or more parties invited to participate in the PTT call has accepted the invitation.

2. The apparatus of claim 1, wherein, to exchange the invitation messages with the first party, the network interface and the processor are further configured to:
   send a second SIP INVITE request to the SIP server in response to the first SIP INVITE request, wherein the second SIP INVITE request is addressed to the first party, wherein the second SIP INVITE request is forwarded to the first party.

3. The apparatus of claim 2, wherein the first SIP INVITE request comprises a Multipurpose Internet Mail Extension (MIME) message, wherein the body of the MIME message comprises a plurality of addresses of a plurality of parties invited to participate in the PTT call, wherein the plurality of addresses comprises the first address of the first party and a second address of a second party.

4. The apparatus of claim 3, wherein at least one of the network interface and the processor are further configured to:
   send a third SIP INVITE request to the SIP server in response to the receiving the first SIP INVITE request, wherein the third SIP INVITE request is addressed to the second party, wherein the third SIP INVITE request is forwarded to the second party.

5. The apparatus of claim 2, wherein the forwarding the second SIP INVITE request to the first party comprises forwarding the second SIP INVITE request to a separate network.

6. The apparatus of claim 1, wherein the first response message comprises a first SIP 200 OK response, and wherein, to exchange the additional messages with the mobile communication device, at least one of the network interface and the processor are further configured to:
   send a second SIP 200 OK response to the SIP server, wherein the second SIP 200 OK response indicates that at least one of the one or more parties invited to participate in the PTT call has accepted the invitation, wherein the second SIP 200 OK response is forwarded to the mobile communication device.

7. The apparatus of claim 6, wherein at least one of the network interface and the processor are further configured to:
   receive, via the SIP server, a SIP ACK message from the mobile communication device, the SIP ACK message responsive to the second SIP 200 OK response.

8. An apparatus for establishing an ad-hoc push-to-talk (PTT) call between users in a wireless communications network, the apparatus comprising:
   a module including a network interface and a processor;
   wherein at least one of the network interface and the processor are configured to:
      exchange invitation messages with a first party, via a session initiation protocol (SIP) server, in response to a first SIP INVITE from a mobile communication device, the first SIP INVITE request comprising one or more addresses of one or more parties invited to participate in the PTT call, wherein the one or more addresses comprise a first address of the first party, wherein at least one of the invitation messages comprises an invitation to the first party to participate in the PTT call; and
      exchange additional response messages with the mobile communication device, via the SIP server, in response to a first response message from the first party, wherein the first response message is responsive to the invitation to the first party, wherein the additional response messages indicate to the mobile communication device that at least one of the one or more parties invited to participate in the PTT call has accepted the invitation.

9. The apparatus of claim 8, wherein, to exchange the invitation messages with the first party, the network interface and the processor are further configured to:

send a second SIP INVITE request to the SIP server in response to the first SIP INVITE request, wherein the second SIP INVITE request is addressed to the first party, wherein the second SIP INVITE request is forwarded to the first party.

10. The apparatus of claim 9, wherein the first SIP INVITE request comprises a Multipurpose Internet Mail Extension (MIME) message, wherein the body of the MIME message comprises a plurality of addresses of a plurality of parties invited to participate in the PTT call, wherein the plurality of addresses comprises the first address of the first party and a second address of a second party.

11. The apparatus of claim 10, wherein at least one of the network interface and the processor are further configured to:
send a third SIP INVITE request to the SIP server in response to the receiving the first SIP INVITE request, wherein the third SIP INVITE request is addressed to the second party, wherein the third SIP INVITE request is forwarded to the second party.

12. The apparatus of claim 9, wherein the forwarding the second SIP INVITE request to the first party comprises forwarding the second SIP INVITE request to a separate network.

13. The apparatus of claim 8, wherein the first response message comprises a first SIP 200 OK response, and wherein, to exchange the additional messages with the mobile communication device, at least one of the network interface and the processor are further configured to:
send a second SIP 200 OK response to the SIP server, wherein the second SIP 200 OK response indicates that at least one of the one or more parties invited to participate in the PTT call has accepted the invitation, wherein the second SIP 200 OK response is forwarded to the mobile communication device.

14. The apparatus of claim 13, wherein at least one of the network interface and the processor are further configured to:
receive, via the SIP server, a SIP ACK message from the mobile communication device, the SIP ACK message responsive to the second SIP 200 OK response.

15. A non-transitory, computer accessible memory medium storing program instructions for establishing an ad-hoc push-to-talk (PTT) call between users in a wireless communications network, wherein the program instructions are executable to cause a processor to:
exchange invitation messages with a first party, via a session initiation protocol (SIP) server, in response to a first SIP INVITE from a mobile communication device, the first SIP INVITE request comprising one or more addresses of one or more parties invited to participate in the PTT call, wherein the one or more addresses comprise a first address of the first party, wherein at least one of the invitation messages comprises an invitation to the first party to participate in the PTT call; and
exchange additional response messages with the mobile communication device, via the SIP server, in response to a first response message from the first party, wherein the first response message is responsive to the invitation to the first party, wherein the additional response messages indicate to the mobile communication device that at least one of the one or more parties invited to participate in the PTT call has accepted the invitation.

16. The non-transitory, computer accessible memory medium of claim 15, wherein, to exchange the invitation messages with the first party, the program instructions are further executable to cause the processor to:
send a second SIP INVITE request to the SIP server in response to the first SIP INVITE request, wherein the second SIP INVITE request is addressed to the first party, wherein the second SIP INVITE request is forwarded to the first party.

17. The non-transitory, computer accessible memory medium of claim 16, wherein the first SIP INVITE request comprises a Multipurpose Internet Mail Extension (MIME) message, wherein the body of the MIME message comprises a plurality of addresses of a plurality of parties invited to participate in the PTT call, wherein the plurality of addresses comprises the first address of the first party and a second address of a second party.

18. The non-transitory, computer accessible memory medium of claim 17, wherein the program instructions are further executable to cause the processor to:
send a third SIP INVITE request to the SIP server in response to the receiving the first SIP INVITE request, wherein the third SIP INVITE request is addressed to the second party, wherein the third SIP INVITE request is forwarded to the second party.

19. The non-transitory, computer accessible memory medium of claim 16, wherein the forwarding the second SIP INVITE request to the first party comprises forwarding the second SIP INVITE request to a separate network.

20. The non-transitory, computer accessible memory medium of claim 15, wherein the first response message comprises a first SIP 200 OK response, and wherein, to exchange the additional messages with the mobile communication device, the program instructions are further executable to cause the processor to:
send a second SIP 200 OK response to the SIP server, wherein the second SIP 200 OK response indicates that at least one of the one or more parties invited to participate in the PTT call has accepted the invitation, wherein the second SIP 200 OK response is forwarded to the mobile communication device.

* * * * *